(12) United States Patent
Moxnes et al.

(10) Patent No.: US 10,594,627 B2
(45) Date of Patent: Mar. 17, 2020

(54) SYSTEM AND METHOD FOR SUPPORTING SCALABLE REPRESENTATION OF SWITCH PORT STATUS IN A HIGH PERFORMANCE COMPUTING ENVIRONMENT

(71) Applicant: Oracle International Corporation, Redwood Shores, CA (US)

(72) Inventors: Dag Georg Moxnes, Oslo (NO); Line Holen, Oslo (NO); Bjørn Dag Johnsen, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/412,995

(22) Filed: Jan. 23, 2017

(65) Prior Publication Data

US 2017/0214600 A1     Jul. 27, 2017

Related U.S. Application Data

(60) Provisional application No. 62/287,704, filed on Jan. 27, 2016.

(51) Int. Cl.
*H04L 12/26*     (2006.01)
*H04L 12/24*     (2006.01)
(Continued)

(52) U.S. Cl.
CPC .............. *H04L 49/25* (2013.01); *G06F 9/451* (2018.02); *G06F 9/45558* (2013.01); *G06F 16/2237* (2019.01); *H04L 41/046* (2013.01); *H04L 41/0803* (2013.01); *H04L 41/0853* (2013.01); *H04L 41/12* (2013.01); *H04L 41/14* (2013.01);
(Continued)

(58) Field of Classification Search
None
See application file for complete search history.

(56) References Cited

U.S. PATENT DOCUMENTS

| | | |
|---|---|---|
| 7,543,046 B1 | 6/2009 | Bae et al. |
| 7,574,526 B2 | 8/2009 | Kashyap et al. |

(Continued)

FOREIGN PATENT DOCUMENTS

WO     2005043842 A1     12/2005

OTHER PUBLICATIONS

European Patent Office, International Searching Authority, International Search Report and Written Opinion dated Apr. 5, 2017 for International Application No. PCT/US2017/014963, 13 Pages.

(Continued)

*Primary Examiner* — Ajit Patel
(74) *Attorney, Agent, or Firm* — Tucker Ellis LLP

(57) ABSTRACT

System and method for supporting scalable representation of switch port status in a high performance computing environment. In accordance with an embodiment, a scalable representation of switch port status can be provided. By adding a scalable representation of switch port status at each switch (both physical and virtual)—instead of getting all switch port changes individually, the scalable representation of switch port status can combine a number of ports that can scale by just using a few bits of information for each port's status.

14 Claims, 14 Drawing Sheets

(51) Int. Cl.

| | |
|---|---|
| *H04L 12/753* | (2013.01) |
| *H04L 12/947* | (2013.01) |
| *H04L 12/931* | (2013.01) |
| *G06F 9/451* | (2018.01) |
| *G06F 16/22* | (2019.01) |
| *G06F 9/455* | (2018.01) |
| *H04L 12/751* | (2013.01) |
| *H04L 12/933* | (2013.01) |
| *H04L 12/935* | (2013.01) |
| *H04L 29/08* | (2006.01) |
| *H04L 29/06* | (2006.01) |
| *H04L 12/44* | (2006.01) |

(52) U.S. Cl.
CPC ...... *H04L 43/0817* (2013.01); *H04L 43/0823* (2013.01); *H04L 43/0882* (2013.01); *H04L 45/02* (2013.01); *H04L 45/48* (2013.01); *H04L 49/10* (2013.01); *H04L 49/15* (2013.01); *H04L 49/30* (2013.01); *H04L 49/358* (2013.01); *H04L 67/10* (2013.01); *H04L 67/1097* (2013.01); *G06F 2009/45579* (2013.01); *G06F 2009/45595* (2013.01); *H04L 12/44* (2013.01); *H04L 49/70* (2013.01); *H04L 63/12* (2013.01); *H04L 63/20* (2013.01)

(56) References Cited

U.S. PATENT DOCUMENTS

| | | | |
|---|---|---|---|
| 7,724,678 B1 | 5/2010 | Johnsen et al. | |
| 7,949,721 B2 | 5/2011 | Burrow et al. | |
| 7,962,562 B1 | 6/2011 | Budhia et al. | |
| 8,009,589 B2 | 8/2011 | Burrow et al. | |
| 8,331,381 B2 | 12/2012 | Brown et al. | |
| 8,661,499 B2 | 2/2014 | Natarajan et al. | |
| 8,862,702 B2 | 10/2014 | Robitaille et al. | |
| 8,908,704 B2 | 12/2014 | Koren et al. | |
| 8,935,333 B2 | 1/2015 | Beukema et al. | |
| 8,953,486 B2 | 2/2015 | Klessig et al. | |
| 9,172,611 B2 | 10/2015 | Guruswamy | |
| 9,548,896 B2 | 1/2017 | Naiksatam et al. | |
| 9,641,439 B2 | 5/2017 | Onoue | |
| 9,647,909 B2 | 5/2017 | Kuan et al. | |
| 9,655,232 B2 | 5/2017 | Saxena et al. | |
| 9,686,179 B2 | 6/2017 | Tatsumi | |
| 9,712,334 B2 | 7/2017 | Jain | |
| 9,819,505 B2 | 11/2017 | Bhat et al. | |
| 9,825,776 B2 | 11/2017 | Calciu et al. | |
| 9,825,814 B2 | 11/2017 | Mekkattuparamban et al. | |
| 9,832,066 B2 | 11/2017 | Zhou et al. | |
| 9,838,315 B2 | 12/2017 | Kapadia et al. | |
| 9,858,104 B2 | 1/2018 | Tripathi et al. | |
| 9,876,715 B2 | 1/2018 | Edsall et al. | |
| 9,923,780 B2 | 3/2018 | Rao et al. | |
| 9,998,356 B2 | 6/2018 | Moreno et al. | |
| 10,055,240 B2 | 8/2018 | Chastain et al. | |
| 10,063,473 B2 | 8/2018 | Wenig | |
| 10,083,062 B2 | 9/2018 | Kuik et al. | |
| 10,103,939 B2 | 10/2018 | Koponen et al. | |
| 2002/0141427 A1 | 10/2002 | McAlpine | |
| 2003/0005039 A1* | 1/2003 | Craddock | G06F 9/4416 709/203 |
| 2003/0208572 A1 | 11/2003 | Shah et al. | |
| 2004/0030763 A1* | 2/2004 | Manter | H04L 41/044 709/223 |
| 2004/0047294 A1 | 3/2004 | Ain et al. | |
| 2004/0114531 A1 | 6/2004 | Tucker et al. | |
| 2004/0153849 A1 | 8/2004 | Tucker et al. | |
| 2004/0190546 A1 | 9/2004 | Jackson | |
| 2005/0060445 A1* | 3/2005 | Beukema | H04L 47/30 710/52 |
| 2005/0071473 A1 | 3/2005 | Rosenstock et al. | |
| 2005/0071709 A1 | 3/2005 | Rosenstock et al. | |
| 2005/0286511 A1 | 12/2005 | Johnsen et al. | |
| 2006/0230219 A1* | 10/2006 | Njoku | G06F 13/102 710/316 |
| 2009/0141734 A1 | 6/2009 | Brown et al. | |
| 2009/0216853 A1 | 8/2009 | Burrow et al. | |
| 2012/0311143 A1* | 12/2012 | Johnsen | H04L 9/3234 709/224 |
| 2013/0121154 A1 | 5/2013 | Guay et al. | |
| 2013/0286824 A1* | 10/2013 | Rangaprasad | H04L 43/026 370/230 |
| 2014/0064287 A1 | 3/2014 | Bogdanski et al. | |
| 2014/0185615 A1* | 7/2014 | Ayoub | H04L 49/358 370/392 |
| 2014/0362709 A1* | 12/2014 | Kashyap | H04L 41/12 370/250 |
| 2015/0295818 A1* | 10/2015 | Hayashitani | H04L 45/28 370/221 |
| 2015/0338909 A1 | 11/2015 | Woodruff | |
| 2016/0006583 A1* | 1/2016 | Takashima | H04L 12/4645 370/392 |
| 2016/0007102 A1 | 1/2016 | Raza et al. | |
| 2016/0077935 A1 | 3/2016 | Zheng et al. | |
| 2016/0080266 A1* | 3/2016 | Fujii | H04L 45/64 370/236 |
| 2016/0119256 A1* | 4/2016 | Wang | H04L 12/6418 370/401 |
| 2016/0315964 A1* | 10/2016 | Shetty | H04L 63/105 |
| 2017/0104817 A1 | 4/2017 | Zahid et al. | |
| 2017/0134211 A1 | 5/2017 | Yoon Lee et al. | |
| 2017/0180240 A1* | 6/2017 | Kern | H04L 45/02 |
| 2017/0214580 A1 | 7/2017 | Moxnes et al. | |

OTHER PUBLICATIONS

Abhinav Vishu et al., "Performance Modeling of Subnet Management on Fat Tree InfiniBand Networks Using OpenSM", Proceedings of the 19th IEEE International Parallel and Distributed Processing Symposium (IPDPS'05), Apr. 8, 2005, 8 Pages.

Francesco Fusco et al., "Real-time creation of bitmap indexes on streaming network data", The VLDB Journal (2012) 21:287-307.

International Search Report and the Written Opinion of the Searching Authority dated Apr. 5, 2017, for PCT Application No. PCT/US2017/015156, 13 pages.

Zahid, et al., "Partition-aware routing to improve network isolation in InfiniBand based multi-tenant clusters", 15th IEEE/ACM International Symposium on Cluster, Cloud and Grid Computing, May 1, 2015, pp. 189-198, 10 pages.

Mellanox Technologies, "Mellanox IB DDR Auto-negotiation Protocol", Rev 1.0, May 7, 2009, 20 pages.

United States Patent and Trademark Office, Office Action dated Dec. 27, 2018 for U.S. Appl. No. 15/416,899, 12 Pages.

United States Patent and Trademark Office, Notice of Allowance dated Jan. 24, 2019 for U.S. Appl. No. 15/414,173, 8 Pages.

United States Patent and Trademark Office, Office Action dated Feb. 15, 2019 for U.S. Appl. No. 15/416,908, 17 Pages.

United States Patent and Trademark Office, Office Action dated Mar. 28, 2019 for U.S. Appl. No. 15/415,497, 23 Pages.

\* cited by examiner

SYSTEM AND METHOD FOR SUPPORTING SCALABLE REPRESENTATION OF SWITCH PORT STATUS IN A HIGH PERFORMANCE COMPUTING ENVIRONMENT

CLAIM OF PRIORITY AND CROSS REFERENCE TO RELATED APPLICATIONS

This application claims the benefit of priority to U.S. Provisional Patent Application entitled "SYSTEM AND METHOD FOR PROVIDING SCALALBE BIT MAP BASED P_KEY TABLE IN A COMPUTING ENVIRONMENT", Application No. 62/287,704, filed on Jan. 27, 2016, which is incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to supporting a scalable representation of switch port status in a high performance computing environment.

BACKGROUND

As larger cloud computing architectures are introduced, the performance and administrative bottlenecks associated with the traditional network and storage have become a significant problem. There has been an increased interest in using high performance lossless interconnects such as InfiniBand (IB) technology as the foundation for a cloud computing fabric. This is the general area that embodiments of the invention are intended to address.

SUMMARY

Described herein systems and methods for supporting scalable representation of switch port status in a high performance computing environment. A method can provide, at one or more computers, including one or more microprocessors, at least one subnet, the at least one subnet comprising one or more switches, the one or more switches comprising at least a leaf switch, wherein each of the one or more switches comprise a plurality of ports, and wherein each of the one or more switches comprise at least one attribute, a plurality of host channel adapters, wherein the plurality of host channel adapters are interconnected via the one or more switches, a plurality of end nodes, each of the plurality of end nodes being associated with at least one host channel adapter of the plurality of host channel adapters, and a subnet manager, the subnet manager running on one of the one or more switches or one of the plurality of host channel adapters. The method can associate each port of the plurality of ports on the one or more switches with a switch port status. The method can represent each switch port status associated with each port of the plurality of ports on each switch in the at least one attribute at the associated switch.

In accordance with an embodiment, one or more of the plurality of host channel adapters can comprise at least one virtual function, at least one virtual switch, and at least one physical function. The plurality of end nodes can comprise physical hosts, virtual machines, or a combination of physical hosts and virtual machines, wherein the virtual machines are associated with at least one virtual function.

DETAILED DESCRIPTION

Figure 1:
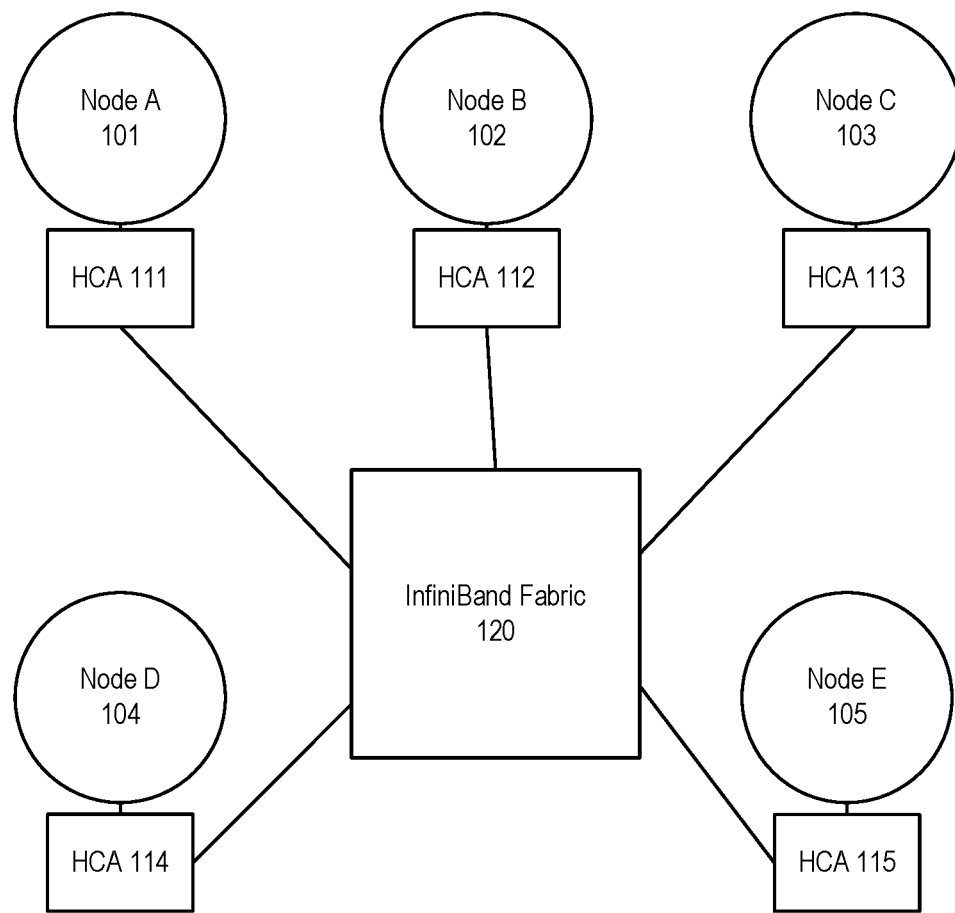
FIG. 1 shows an illustration of an InfiniBand environment, in accordance with an embodiment.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

Common reference numerals can be used to indicate like elements throughout the drawings and detailed description; therefore, reference numerals used in a figure may or may not be referenced in the detailed description specific to such figure if the element is described elsewhere.

Described herein are systems and methods to support a scalable representation of switch port status in a high performance computing environment.

The following description of the invention uses an InfiniBand™ (IB) network as an example for a high performance network. Throughout the following description, reference can be made to the InfiniBand™ specification (also referred to variously as the InfiniBand specification, IB specification, or the legacy IB specification). Such reference is understood to refer to the InfiniBand® Trade Association Architecture Specification, Volume 1, Version 1.3, released March, 2015, available at http://www.inifinibandta.org, which is herein incorporated by reference in its entirety. It will be apparent to those skilled in the art that other types of high performance networks can be used without limitation. The following description also uses the fat-tree topology as an example for a fabric topology. It will be apparent to those skilled in the art that other types of fabric topologies can be used without limitation.

To meet the demands of the cloud in the current era (e.g., Exascale era), it is desirable for virtual machines to be able to utilize low overhead network communication paradigms such as Remote Direct Memory Access (RDMA). RDMA bypasses the OS stack and communicates directly with the hardware, thus, pass-through technology like Single-Root I/O Virtualization (SR-IOV) network adapters can be used. In accordance with an embodiment, a virtual switch (vSwitch) SR-IOV architecture can be provided for applicability in high performance lossless interconnection networks. As network reconfiguration time is critical to make live-migration a practical option, in addition to network architecture, a scalable and topology-agnostic dynamic reconfiguration mechanism can be provided.

In accordance with an embodiment, and furthermore, routing strategies for virtualized environments using vSwitches can be provided, and an efficient routing algorithm for network topologies (e.g., Fat-Tree topologies) can be provided. The dynamic reconfiguration mechanism can be further tuned to minimize imposed overhead in Fat-Trees.

In accordance with an embodiment of the invention, virtualization can be beneficial to efficient resource utilization and elastic resource allocation in cloud computing. Live migration makes it possible to optimize resource usage by moving virtual machines (VMs) between physical servers in an application transparent manner. Thus, virtualization can enable consolidation, on-demand provisioning of resources, and elasticity through live migration.

InfiniBand™

InfiniBand™ (IB) is an open standard lossless network technology developed by the InfiniBand™ Trade Association. The technology is based on a serial point-to-point full-duplex interconnect that offers high throughput and low latency communication, geared particularly towards high-performance computing (HPC) applications and datacenters.

The InfiniBand™ Architecture (IBA) supports a two-layer topological division. At the lower layer, IB networks are referred to as subnets, where a subnet can include a set of hosts interconnected using switches and point-to-point links. At the higher level, an IB fabric constitutes one or more subnets, which can be interconnected using routers.

Within a subnet, hosts can be connected using switches and point-to-point links. Additionally, there can be a master management entity, the subnet manager (SM), which resides on a designated device in the subnet. The subnet manager is responsible for configuring, activating and maintaining the IB subnet. Additionally, the subnet manager (SM) can be responsible for performing routing table calculations in an IB fabric. Here, for example, the routing of the IB network aims at proper load balancing between all source and destination pairs in the local subnet.

Through the subnet management interface, the subnet manager exchanges control packets, which are referred to as subnet management packets (SMPs), with subnet management agents (SMAs). The subnet management agents reside on every IB subnet device. By using SMPs, the subnet manager is able to discover the fabric, configure end nodes and switches, and receive notifications from SMAs.

In accordance with an embodiment, intra-subnet routing in an IB network can be based on linear forwarding tables (LFTs) stored in the switches. The LFTs are calculated by the SM according to the routing mechanism in use. In a subnet, Host Channel Adapter (HCA) ports on the end nodes and switches are addressed using local identifiers (LIDs). Each entry in a linear forwarding table (LFT) consists of a destination LID (DLID) and an output port. Only one entry per LID in the table is supported. When a packet arrives at a switch, its output port is determined by looking up the DLID in the forwarding table of the switch. The routing is deterministic as packets take the same path in the network between a given source-destination pair (LID pair).

Generally, all other subnet managers, excepting the master subnet manager, act in standby mode for fault-tolerance. In a situation where a master subnet manager fails, however, a new master subnet manager is negotiated by the standby subnet managers. The master subnet manager also performs periodic sweeps of the subnet to detect any topology changes and reconfigure the network accordingly.

Furthermore, hosts and switches within a subnet can be addressed using local identifiers (LIDs), and a single subnet can be limited to 49151 unicast LIDs. Besides the LIDs, which are the local addresses that are valid within a subnet, each IB device can have a 64-bit global unique identifier (GUID). A GUID can be used to form a global identifier (GID), which is an IB layer three (L3) address.

The SM can calculate routing tables (i.e., the connections/routes between each pair of nodes within the subnet) at network initialization time. Furthermore, the routing tables can be updated whenever the topology changes, in order to ensure connectivity and optimal performance. During normal operations, the SM can perform periodic light sweeps of the network to check for topology changes. If a change is discovered during a light sweep or if a message (trap) signaling a network change is received by the SM, the SM can reconfigure the network according to the discovered changes.

For example, the SM can reconfigure the network when the network topology changes, such as when a link goes down, when a device is added, or when a link is removed. The reconfiguration steps can include the steps performed during the network initialization. Furthermore, the reconfigurations can have a local scope that is limited to the subnets, in which the network changes occurred. Also, the segmenting of a large fabric with routers may limit the reconfiguration scope.

An example InfiniBand fabric is shown in FIG. 1, which shows an illustration of an InfiniBand environment 100, in accordance with an embodiment. In the example shown in FIG. 1, nodes A-E, 101-105, use the InfiniBand fabric, 120, to communicate, via the respective host channel adapters 111-115. In accordance with an embodiment, the various nodes, e.g., nodes A-E, 101-105, can be represented by various physical devices. In accordance with an embodiment, the various nodes, e.g., nodes A-E, 101-105, can be represented by various virtual devices, such as virtual machines.

Partitioning in InfiniBand

In accordance with an embodiment, IB networks can support partitioning as a security mechanism to provide for isolation of logical groups of systems sharing a network fabric. Each HCA port on a node in the fabric can be a member of one or more partitions. Partition memberships are managed by a centralized partition manager, which can be part of the SM. The SM can configure partition membership information on each port as a table of 16-bit partition keys (P_Keys). The SM can also configure switch and router ports with the partition enforcement tables containing P_Key information associated with the end-nodes that send or receive data traffic through these ports. Additionally, in a general case, partition membership of a switch port can represent a union of all membership indirectly associated with LIDs routed via the port in an egress (towards the link) direction.

In accordance with an embodiment, partitions are logical groups of ports such that the members of a group can only communicate to other members of the same logical group. At host channel adapters (HCAs) and switches, packets can be filtered using the partition membership information to enforce isolation. Packets with invalid partitioning information can be dropped as soon as the packets reaches an incoming port. In partitioned IB systems, partitions can be used to create tenant clusters. With partition enforcement in place, a node cannot communicate with other nodes that belong to a different tenant cluster. In this way, the security of the system can be guaranteed even in the presence of compromised or malicious tenant nodes.

In accordance with an embodiment, for the communication between nodes, Queue Pairs (QPs) and End-to-End contexts (EECs) can be assigned to a particular partition, except for the management Queue Pairs (QP0 and QP1). The P_Key information can then be added to every IB transport packet sent. When a packet arrives at an HCA port or a switch, its P_Key value can be validated against a table configured by the SM. If an invalid P_Key value is found, the packet is discarded immediately. In this way, communication is allowed only between ports sharing a partition.

Figure 2:
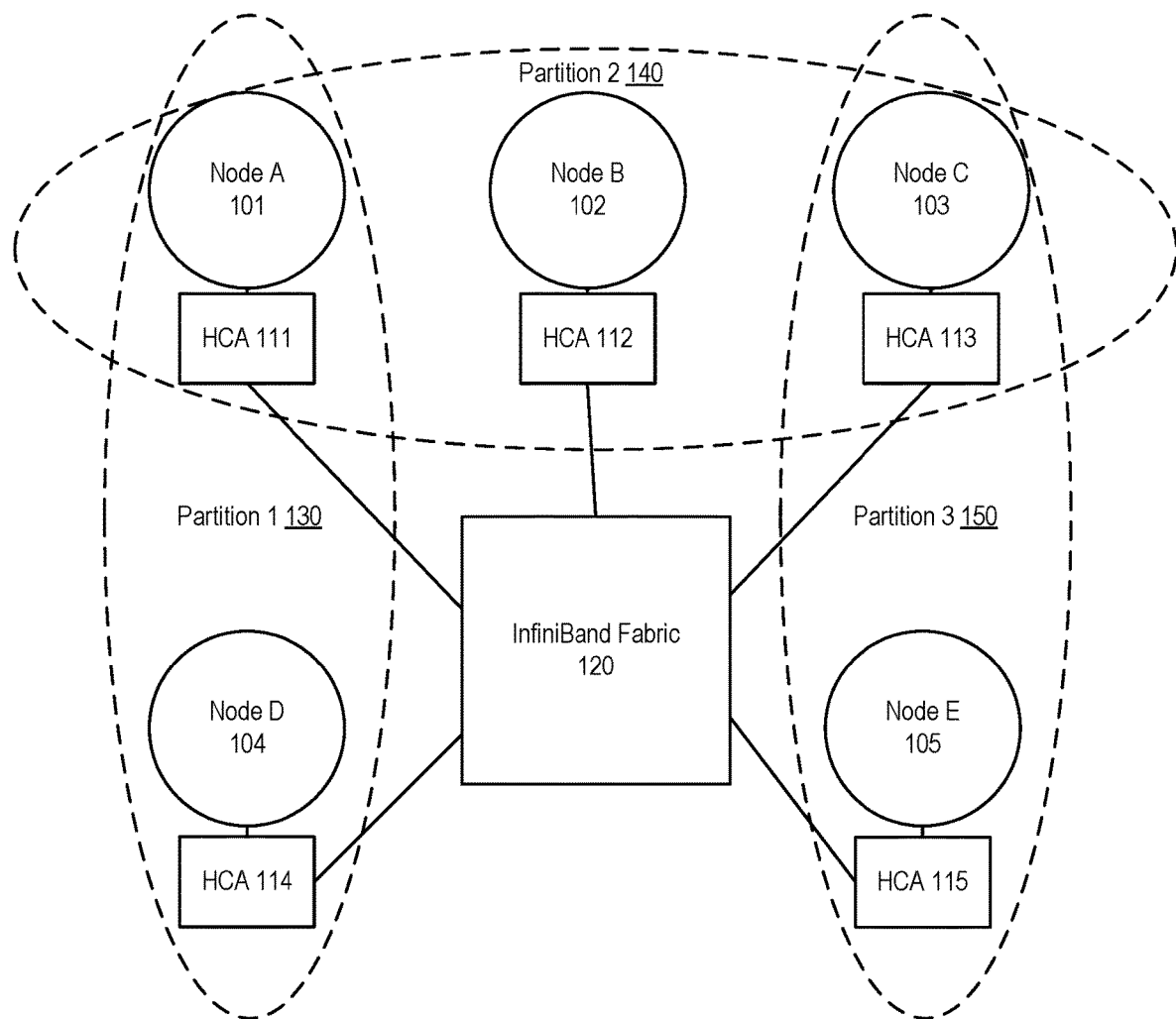
FIG. 2 shows an illustration of a partitioned cluster environment, in accordance with an embodiment

An example of IB partitions is shown in FIG. 2, which shows an illustration of a partitioned cluster environment, in accordance with an embodiment. In the example shown in FIG. 2, nodes A-E, 101-105, use the InfiniBand fabric, 120, to communicate, via the respective host channel adapters 111-115. The nodes A-E are arranged into partitions, namely partition 1, 130, partition 2, 140, and partition 3, 150. Partition 1 comprises node A 101 and node D 104. Partition 2 comprises node A 101, node B 102, and node C 103. Partition 3 comprises node C 103 and node E 105. Because of the arrangement of the partitions, node D 104 and node E 105 are not allowed to communicate as these nodes do not share a partition. Meanwhile, for example, node A 101 and node C 103 are allowed to communicate as these nodes are both members of partition 2, 140.

Virtual Machines in InfiniBand

During the last decade, the prospect of virtualized High Performance Computing (HPC) environments has improved considerably as CPU overhead has been practically removed through hardware virtualization support; memory overhead has been significantly reduced by virtualizing the Memory Management Unit; storage overhead has been reduced by the use of fast SAN storages or distributed networked file systems; and network I/O overhead has been reduced by the use of device passthrough techniques like Single Root Input/Output Virtualization (SR-IOV). It is now possible for clouds to accommodate virtual HPC (vHPC) clusters using high performance interconnect solutions and deliver the necessary performance.

However, when coupled with lossless networks, such as InfiniBand (IB), certain cloud functionality, such as live migration of virtual machines (VMs), still remains an issue due to the complicated addressing and routing schemes used in these solutions. IB is an interconnection network technology offering high bandwidth and low latency, thus, is very well suited for HPC and other communication intensive workloads.

The traditional approach for connecting IB devices to VMs is by utilizing SR-IOV with direct assignment. However, achieving live migration of VMs assigned with IB Host Channel Adapters (HCAs) using SR-IOV has proved to be challenging. Each IB connected node has three different addresses: LID, GUID, and GID. When a live migration happens, one or more of these addresses change. Other nodes communicating with the VM-in-migration can lose connectivity. When this happens, the lost connection can be attempted to be renewed by locating the virtual machine's new address to reconnect to by sending Subnet Administration (SA) path record queries to the IB Subnet Manager (SM).

IB uses three different types of addresses. A first type of address is the 16 bits Local Identifier (LID). At least one unique LID is assigned to each HCA port and each switch by the SM. The LIDs are used to route traffic within a subnet. Since the LID is 16 bits long, 65536 unique address combinations can be made, of which only 49151 (0x0001-0xBFFF) can be used as unicast addresses. Consequently, the number of available unicast addresses defines the maximum size of an IB subnet. A second type of address is the 64 bits Global Unique Identifier (GUID) assigned by the manufacturer to each device (e.g. HCAs and switches) and each HCA port. The SM may assign additional subnet unique GUIDs to an HCA port, which is useful when SR-IOV is used. A third type of address is the 128 bits Global Identifier (GID). The GID is a valid IPv6 unicast address, and at least one is assigned to each HCA port. The GID is formed by combining a globally unique 64 bits prefix assigned by the fabric administrator, and the GUID address of each HCA port.

Fat-Tree (FTree) Topologies and Routing

In accordance with an embodiment, some of the IB based HPC systems employ a fat-tree topology to take advantage of the useful properties fat-trees offer. These properties include full bisection-bandwidth and inherent fault-tolerance due to the availability of multiple paths between each source destination pair. The initial idea behind fat-trees was to employ fatter links between nodes, with more available bandwidth, as the tree moves towards the roots of the topology. The fatter links can help to avoid congestion in the upper-level switches and the bisection-bandwidth is maintained.

Figure 3:
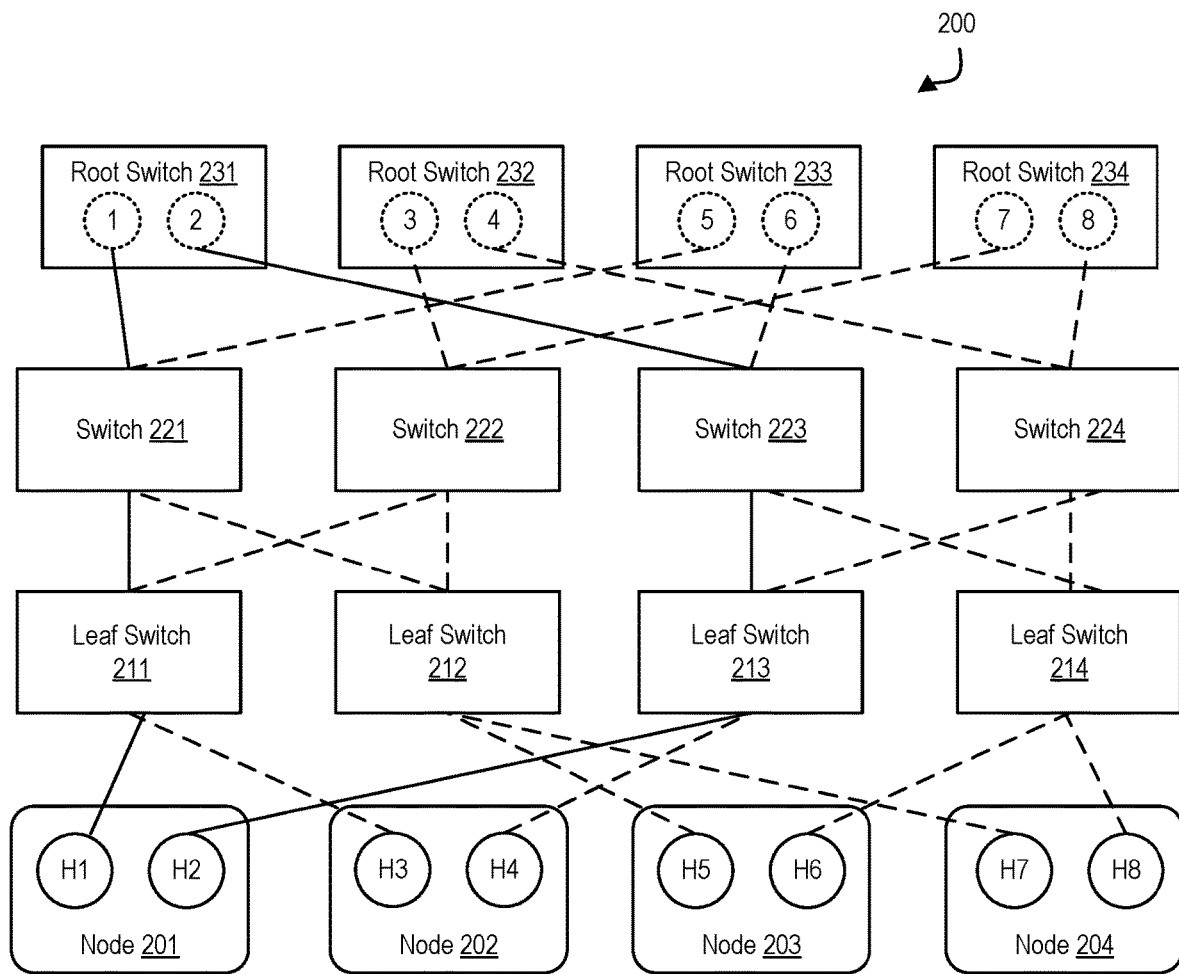
FIG. 3 shows an illustration of a tree topology in a network environment, in accordance with an embodiment.

FIG. 3 shows an illustration of a tree topology in a network environment, in accordance with an embodiment. As shown in FIG. 3, one or more end nodes 201-204 can be connected in a network fabric 200. The network fabric 200 can be based on a fat-tree topology, which includes a plurality of leaf switches 211-214, and multiple spine switches or root switches 231-234. Additionally, the network fabric 200 can include one or more intermediate switches, such as switches 221-224.

Also as shown in FIG. 3, each of the end nodes 201-204 can be a multi-homed node, i.e., a single node that is connected to two or more parts of the network fabric 200 through multiple ports. For example, the node 201 can include the ports H1 and H2, the node 202 can include the ports H3 and H4, the node 203 can include the ports H5 and H6, and the node 204 can include the ports H7 and H8.

Additionally, each switch can have multiple switch ports. For example, the root switch 231 can have the switch ports 1-2, the root switch 232 can have the switch ports 3-4, the root switch 233 can have the switch ports 5-6, and the root switch 234 can have the switch ports 7-8.

In accordance with an embodiment, the fat-tree routing mechanism is one of the most popular routing algorithm for IB based fat-tree topologies. The fat-tree routing mechanism is also implemented in the OFED (Open Fabric Enterprise Distribution—a standard software stack for building and deploying IB based applications) subnet manager, OpenSM.

The fat-tree routing mechanism aims to generate LFTs that evenly spread shortest-path routes across the links in the network fabric. The mechanism traverses the fabric in the indexing order and assigns target LIDs of the end nodes, and thus the corresponding routes, to each switch port. For the end nodes connected to the same leaf switch, the indexing order can depend on the switch port to which the end node is connected (i.e., port numbering sequence). For each port, the mechanism can maintain a port usage counter, and can use this port usage counter to select a least-used port each time a new route is added.

In accordance with an embodiment, in a partitioned subnet, nodes that are not members of a common partition are not allowed to communicate. Practically, this means that some of the routes assigned by the fat-tree routing algorithm are not used for the user traffic. The problem arises when the fat tree routing mechanism generates LFTs for those routes the same way it does for the other functional paths. This behavior can result in degraded balancing on the links, as nodes are routed in the order of indexing. As routing can be performed oblivious to the partitions, fat-tree routed subnets, in general, provide poor isolation among partitions.

In accordance with an embodiment, a Fat-Tree is a hierarchical network topology that can scale with the available network resources. Moreover, Fat-Trees are easy to build using commodity switches placed on different levels of the hierarchy. Different variations of Fat-Trees are commonly available, including k-ary-n-trees, Extended Generalized Fat-Trees (XGFTs), Parallel Ports Generalized Fat-Trees (PGFTs) and Real Life Fat-Trees (RLFTs).

A k-ary-n-tree is an n level Fat-Tree with $k^n$ end nodes and $n \cdot k^{n-1}$ switches, each with 2k ports. Each switch has an equal number of up and down connections in the tree. XGFT Fat-Tree extends k-ary-n-trees by allowing both different number of up and down connections for the switches, and different number of connections at each level in the tree. The PGFT definition further broadens the XGFT topologies and permits multiple connections between switches. A large variety of topologies can be defined using XGFTs and PGFTs. However, for practical purposes, RLFT, which is a restricted version of PGFT, is introduced to define Fat-Trees commonly found in today's HPC clusters. An RLFT uses the same port-count switches at all levels in the Fat-Tree.
Input/Output (I/O) Virtualization In accordance with an embodiment, I/O Virtualization (IOV) can provide availability of I/O by allowing virtual machines (VMs) to access the underlying physical resources. The combination of storage traffic and inter-server communication impose an increased load that may overwhelm the I/O resources of a single server, leading to backlogs and idle processors as they are waiting for data. With the increase in number of I/O requests, IOV can provide availability; and can improve performance, scalability and flexibility of the (virtualized) I/O resources to match the level of performance seen in modern CPU virtualization.

In accordance with an embodiment, IOV is desired as it can allow sharing of I/O resources and provide protected access to the resources from the VMs. IOV decouples a logical device, which is exposed to a VM, from its physical implementation. Currently, there can be different types of IOV technologies, such as emulation, paravirtualization, direct assignment (DA), and single root-I/O virtualization (SR-IOV).

In accordance with an embodiment, one type of IOV technology is software emulation. Software emulation can allow for a decoupled front-end/back-end software architecture. The front-end can be a device driver placed in the VM, communicating with the back-end implemented by a hypervisor to provide I/O access. The physical device sharing ratio is high and live migrations of VMs are possible with just a few milliseconds of network downtime. However, software emulation introduces additional, undesired computational overhead.

In accordance with an embodiment, another type of IOV technology is direct device assignment. Direct device assignment involves a coupling of I/O devices to VMs, with no device sharing between VMs. Direct assignment, or device passthrough, provides near to native performance with minimum overhead. The physical device bypasses the hypervisor and is directly attached to the VM. However, a downside of such direct device assignment is limited scalability, as there is no sharing among virtual machines—one physical network card is coupled with one VM.

In accordance with an embodiment, Single Root IOV (SR-IOV) can allow a physical device to appear through hardware virtualization as multiple independent lightweight instances of the same device. These instances can be assigned to VMs as passthrough devices, and accessed as Virtual Functions (VFs). The hypervisor accesses the device through a unique (per device), fully featured Physical Function (PF). SR-IOV eases the scalability issue of pure direct assignment. However, a problem presented by SR-IOV is that it can impair VM migration. Among these IOV technologies, SR-IOV can extend the PCI Express (PCIe) specification with the means to allow direct access to a single physical device from multiple VMs while maintaining near to native performance. Thus, SR-IOV can provide good performance and scalability.

SR-IOV allows a PCIe device to expose multiple virtual devices that can be shared between multiple guests by allocating one virtual device to each guest. Each SR-IOV device has at least one physical function (PF) and one or more associated virtual functions (VF). A PF is a normal PCIe function controlled by the virtual machine monitor (VMM), or hypervisor, whereas a VF is a light-weight PCIe function. Each VF has its own base address (BAR) and is assigned with a unique requester ID that enables I/O memory management unit (IOMMU) to differentiate between the traffic streams to/from different VFs. The IOMMU also apply memory and interrupt translations between the PF and the VFs.

Unfortunately, however, direct device assignment techniques pose a barrier for cloud providers in situations where transparent live migration of virtual machines is desired for data center optimization. The essence of live migration is that the memory contents of a VM are copied to a remote hypervisor. Then the VM is paused at the source hypervisor, and the VM's operation is resumed at the destination. When using software emulation methods, the network interfaces are virtual so their internal states are stored into the memory and get copied as well. Thus the downtime could be brought down to a few milliseconds.

However, migration becomes more difficult when direct device assignment techniques, such as SR-IOV, are used. In such situations, a complete internal state of the network interface cannot be copied as it is tied to the hardware. The SR-IOV VFs assigned to a VM are instead detached, the live migration will run, and a new VF will be attached at the destination. In the case of InfiniBand and SR-IOV, this process can introduce downtime in the order of seconds. Moreover, in an SR-IOV shared port model the addresses of the VM will change after the migration, causing additional overhead in the SM and a negative impact on the performance of the underlying network fabric.

InfiniBand SR-IOV Architecture—Shared Port

There can be different types of SR-IOV models, e.g. a shared port model, a virtual switch model, and a virtual port model.

Figure 4:
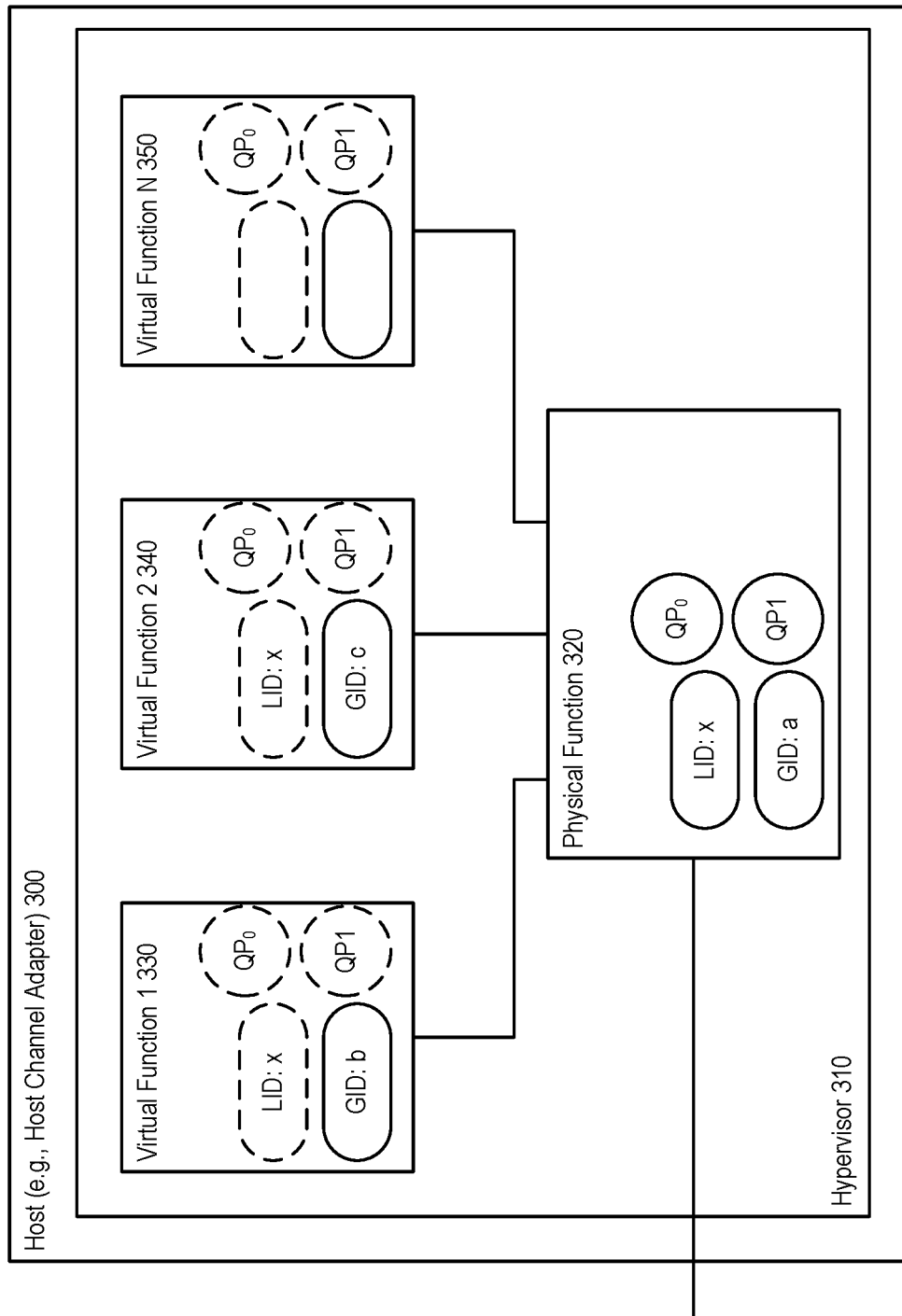
FIG. 4 shows an exemplary shared port architecture, in accordance with an embodiment.

FIG. 4 shows an exemplary shared port architecture, in accordance with an embodiment. As depicted in the figure, a host 300 (e.g., a host channel adapter) can interact with a hypervisor 310, which can assign the various virtual functions 330, 340, 350, to a number of virtual machines. As well, the physical function can be handled by the hypervisor 310.

In accordance with an embodiment, when using a shared port architecture, such as that depicted in FIG. 4, the host, e.g., HCA, appears as a single port in the network with a single shared LID and shared Queue Pair (QP) space between the physical function 320 and the virtual functions 330, 350, 350. However, each function (i.e., physical function and virtual functions) can have their own GID.

As shown in FIG. 4, in accordance with an embodiment, different GIDs can be assigned to the virtual functions and the physical function, and the special queue pairs, QP0 and QP1 (i.e., special purpose queue pairs that are used for InfiniBand management packets), are owned by the physical function. These QPs are exposed to the VFs as well, but the VFs are not allowed to use QP0 (all SMPs coming from VFs towards QP0 are discarded), and QP1 can act as a proxy of the actual QP1 owned by the PF.

In accordance with an embodiment, the shared port architecture can allow for highly scalable data centers that are not limited by the number of VMs (which attach to the network by being assigned to the virtual functions), as the LID space is only consumed by physical machines and switches in the network.

However, a shortcoming of the shared port architecture is the inability to provide transparent live migration, hindering the potential for flexible VM placement. As each LID is associated with a specific hypervisor, and shared among all VMs residing on the hypervisor, a migrating VM (i.e., a virtual machine migrating to a destination hypervisor) has to have its LID changed to the LID of the destination hypervisor. Furthermore, as a consequence of the restricted QP0 access, a subnet manager cannot run inside a VM.

InfiniBand SR-IOV Architecture Models—Virtual Switch (vSwitch)

Figure 5:
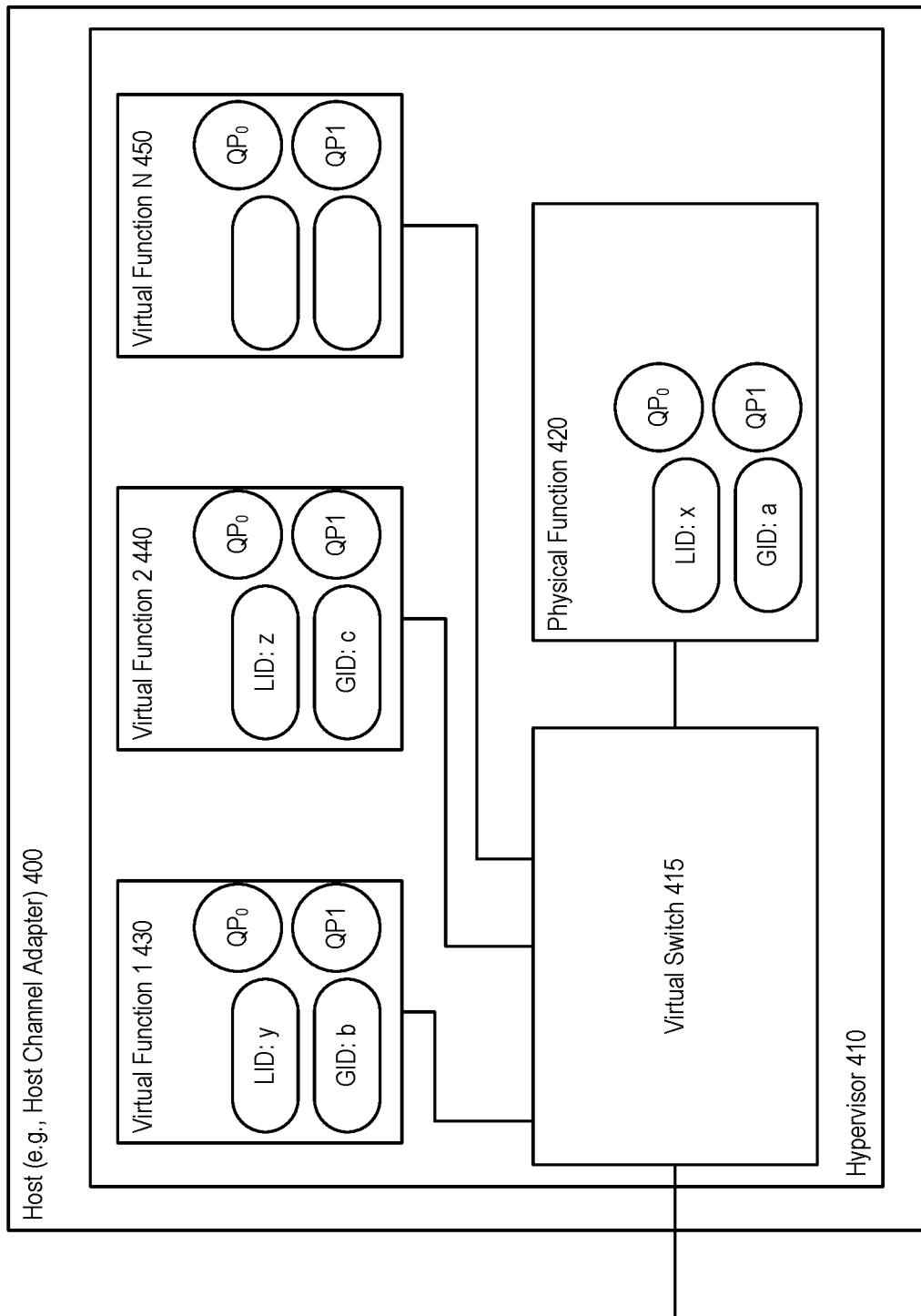
FIG. 5 shows an exemplary vSwitch architecture, in accordance with an embodiment.

FIG. 5 shows an exemplary vSwitch architecture, in accordance with an embodiment. As depicted in the figure, a host 400 (e.g., a host channel adapter) can interact with a hypervisor 410, which can assign the various virtual functions 430, 440, 450, to a number of virtual machines. As well, the physical function can be handled by the hypervisor 410. A virtual switch 415 can also be handled by the hypervisor 401.

In accordance with an embodiment, in a vSwitch architecture each virtual function 430, 440, 450 is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM, the HCA 400 looks like a switch, via the virtual switch 415, with additional nodes connected to it. The hypervisor 410 can use the PF 420, and the VMs (attached to the virtual functions) use the VFs.

In accordance with an embodiment, a vSwitch architecture provide transparent virtualization. However, because each virtual function is assigned a unique LID, the number of available LIDs gets consumed rapidly. As well, with many LID addresses in use (i.e., one each for each physical function and each virtual function), more communication paths have to be computed by the SM and more Subnet Management Packets (SMPs) have to be sent to the switches in order to update their LFTs. For example, the computation of the communication paths might take several minutes in large networks. Because LID space is limited to 49151 unicast LIDs, and as each VM (via a VF), physical node, and switch occupies one LID each, the number of physical nodes and switches in the network limits the number of active VMs, and vice versa.

InfiniBand SR-IOV Architecture Models—Virtual Port (vPort)

Figure 6:
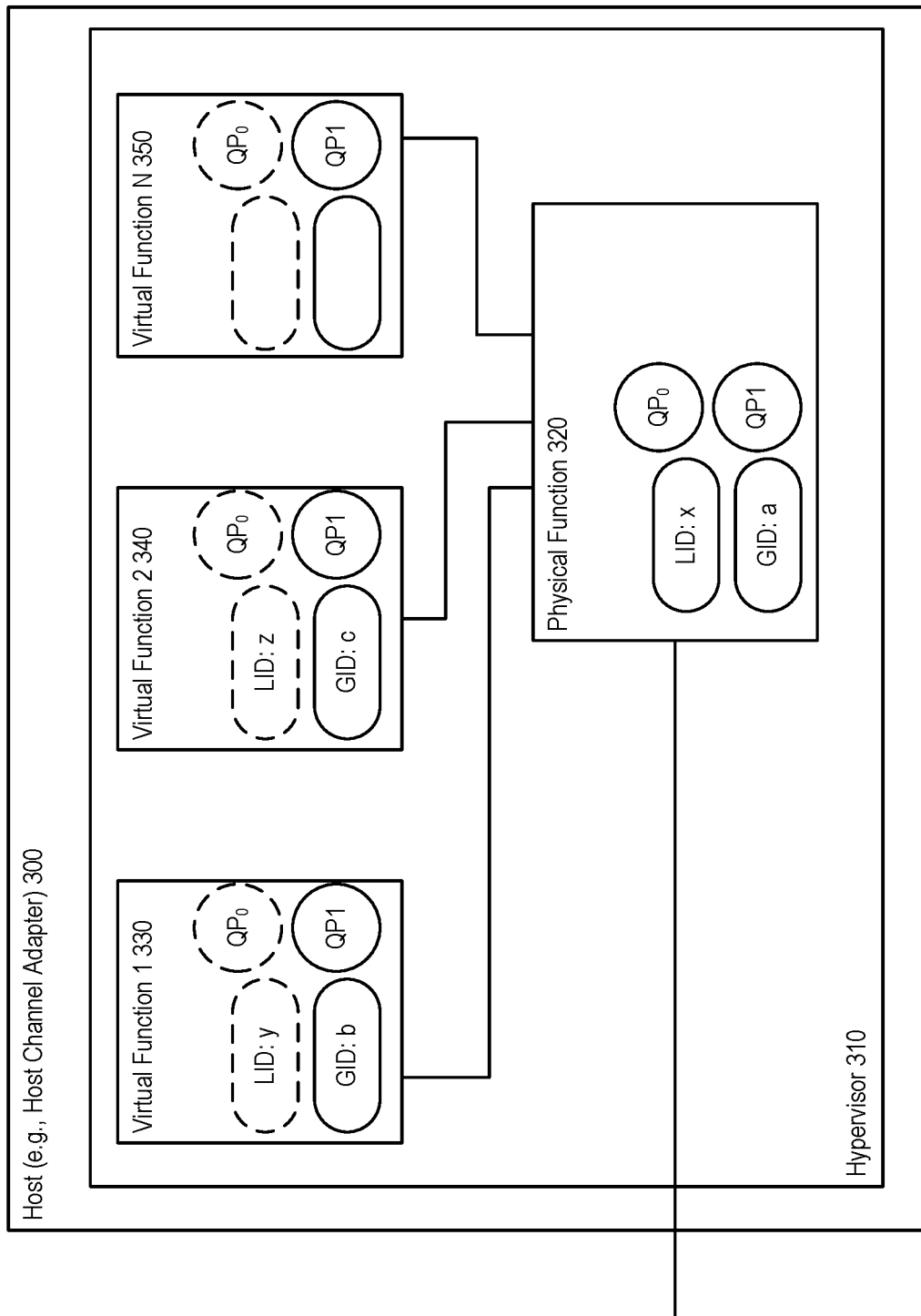
FIG. 6 shows an exemplary vPort architecture, in accordance with an embodiment.

FIG. 6 shows an exemplary vPort concept, in accordance with an embodiment. As depicted in the figure, a host 300 (e.g., a host channel adapter) can interact with a hypervisor 410, which can assign the various virtual functions 330, 340, 350, to a number of virtual machines. As well, the physical function can be handled by the hypervisor 310.

In accordance with an embodiment, the vPort concept is loosely defined in order to give freedom of implementation to vendors (e.g. the definition does not rule that the implementation has to be SRIOV specific), and a goal of the vPort is to standardize the way VMs are handled in subnets. With the vPort concept, both SR-IOV Shared-Port-like and vSwitch-like architectures or a combination of both, that can be more scalable in both the space and performance domains, can be defined. A vPort supports optional LIDs, and unlike the Shared-Port, the SM is aware of all the vPorts available in a subnet even if a vPort is not using a dedicated LID.

InfiniBand SR-IOV Architecture Models—vSwitch with Prepopulated LIDs

In accordance with an embodiment, the present disclosure provides a system and method for providing a vSwitch architecture with prepopulated LIDs.

Figure 7:
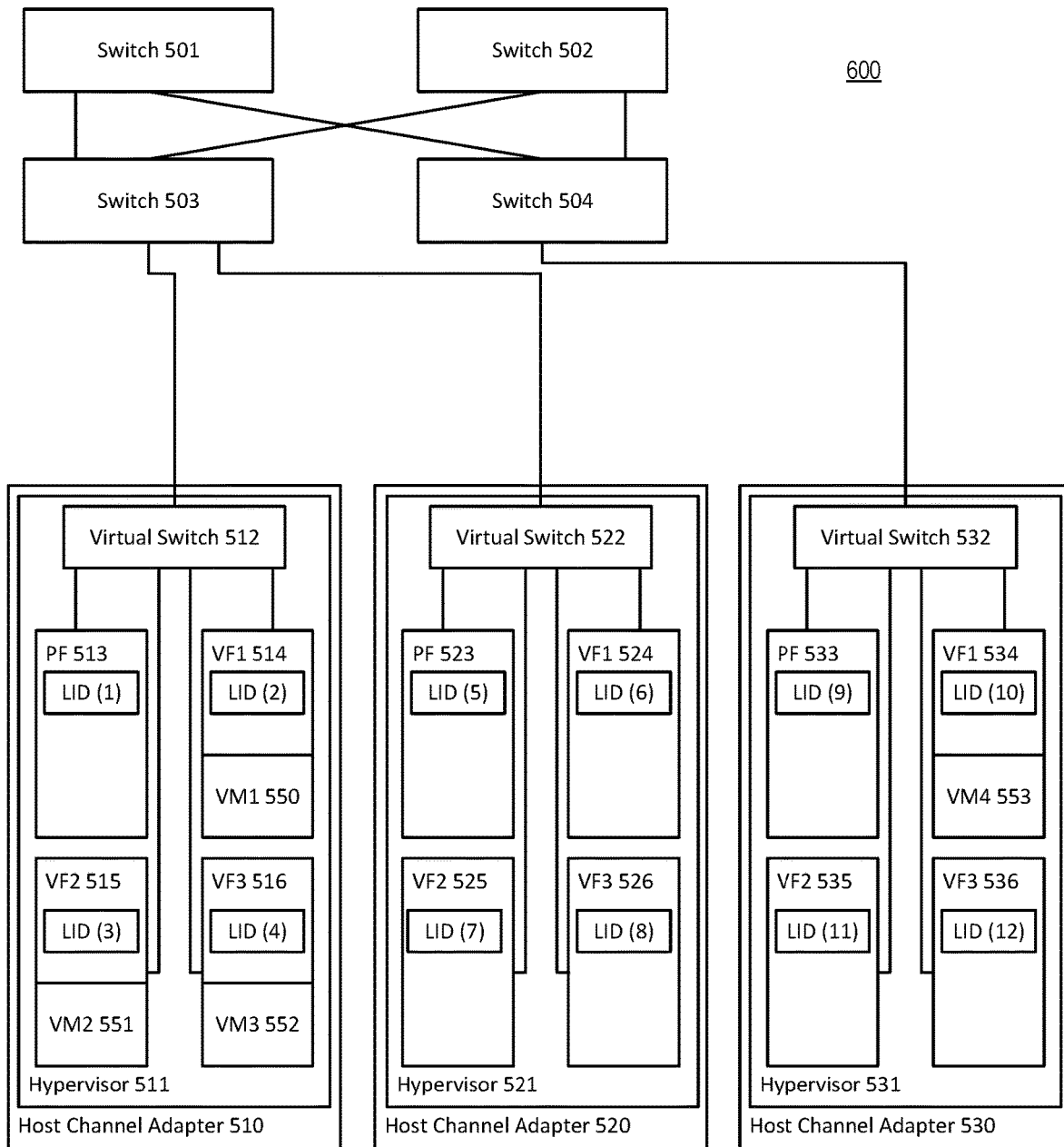
FIG. 7 shows an exemplary vSwitch architecture with prepopulated LIDs, in accordance with an embodiment.

FIG. 7 shows an exemplary vSwitch architecture with prepopulated LIDs, in accordance with an embodiment. As depicted in the figure, a number of switches 501-504 can provide communication within the network switched environment 600 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516.

Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 600.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with prepopulated LIDs. Referring to FIG. 7, the LIDs are prepopulated to the various physical functions 513, 523, 533, as well as the virtual functions 514-516, 524-526, 534-536 (even those virtual functions not currently associated with an active virtual machine). For example, physical function 513 is prepopulated with LID 1, while virtual function 1 534 is prepopulated with LID 10. The LIDs are prepopulated in an SR-IOV vSwitch-enabled subnet when the network is booted. Even when not all of the VFs are occupied by VMs in the network, the populated VFs are assigned with a LID as shown in FIG. 7.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, in a vSwitch architecture with prepopulated LIDs, each hypervisor can consume one LID for itself through the PF and one more LID for each additional VF. The sum of all the VFs available in all hypervisors in an IB subnet, gives the maximum amount of VMs that are allowed to run in the subnet. For example, in an IB subnet with 16 virtual functions per hypervisor in the subnet, then each hypervisor consumes 17 LIDs (one LID for each of the 16 virtual functions plus one LID for the physical function) in the subnet. In such an IB subnet, the theoretical hypervisor limit for a single subnet is ruled by the number of available unicast LIDs and is: 2891 (49151 available LIDs divided by 17 LIDs per hypervisor), and the total number of VMs (i.e., the limit) is 46256 (2891 hypervisors times 16 VFs per hypervisor). (In actuality, these numbers are actually smaller since each switch, router, or dedicated SM node in the IB subnet consumes a LID as well). Note that the vSwitch does not need to occupy an additional LID as it can share the LID with the PF In accordance with an embodiment, in a vSwitch architecture with prepopulated LIDs, communication paths are computed for all the LIDs the first time the network is booted. When a new VM needs to be started the system does not have to add a new LID in the subnet, an action that would otherwise cause a complete reconfiguration of the network, including path recalculation, which is the most time consuming part. Instead, an available port for a VM is located (i.e., an available virtual function) in one of the hypervisors and the virtual machine is attached to the available virtual function.

In accordance with an embodiment, a vSwitch architecture with prepopulated LIDs also allows for the ability to calculate and use different paths to reach different VMs hosted by the same hypervisor. Essentially, this allows for such subnets and networks to use a LID Mask Control (LMC) like feature to provide alternative paths towards one physical machine, without being bound by the limitation of the LMC that requires the LIDs to be sequential. The freedom to use non-sequential LIDs is particularly useful when a VM needs to be migrated and carry its associated LID to the destination.

In accordance with an embodiment, along with the benefits shown above of a vSwitch architecture with prepopulated LIDs, certain considerations can be taken into account. For example, because the LIDs are prepopulated in an SR-IOV vSwitch-enabled subnet when the network is booted, the initial path computation (e.g., on boot-up) can take longer than if the LIDs were not pre-populated.

InfiniBand SR-IOV Architecture Models—vSwitch with Dynamic LID Assignment

In accordance with an embodiment, the present disclosure provides a system and method for providing a vSwitch architecture with dynamic LID assignment.

Figure 8:
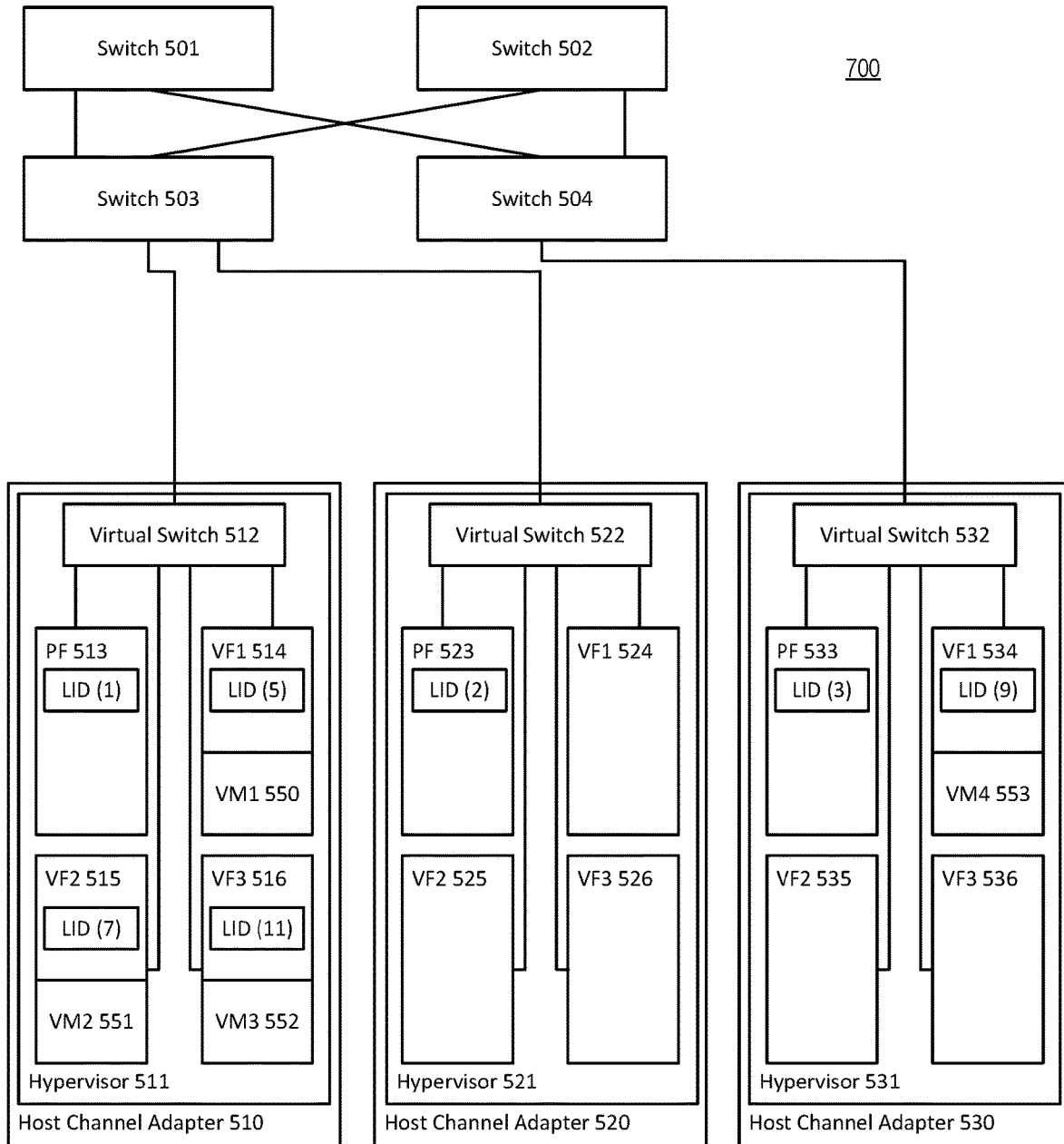
FIG. 8 shows an exemplary vSwitch architecture with dynamic LID assignment, in accordance with an embodiment.

FIG. 8 shows an exemplary vSwitch architecture with dynamic LID assignment, in accordance with an embodiment. As depicted in the figure, a number of switches 501-504 can provide communication within the network switched environment 700 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 700.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with dynamic LID assignment. Referring to FIG. 8, the LIDs are dynamically assigned to the various physical functions 513, 523, 533, with physical function 513 receiving LID 1, physical function 523 receiving LID 2, and physical function 533 receiving LID 3. Those virtual functions that are associated with an active virtual machine can also receive a dynamically assigned LID. For example, because virtual machine 1 550 is active and associated with virtual function 1 514, virtual function 514 can be assigned LID 5. Likewise, virtual function 2 515, virtual function 3 516, and virtual function 1 534 are each associated with an active virtual function. Because of this, these virtual functions are assigned LIDs, with LID 7 being assigned to virtual function 2 515, LID 11 being assigned to virtual function 3 516, and LID 9 being assigned to virtual function 1 534. Unlike vSwitch with prepopulated LIDs, those virtual functions not currently associated with an active virtual machine do not receive a LID assignment.

In accordance with an embodiment, with the dynamic LID assignment, the initial path computation can be substantially reduced. When the network is booting for the first time and no VMs are present then a relatively small number of LIDs can be used for the initial path calculation and LFT distribution.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, when a new VM is created in a system utilizing vSwitch with dynamic LID assignment, a free VM slot is found in order to decide on which hypervisor to boot the newly added VM, and a unique non-used unicast LID is found as well. However, there are no known paths in the network and the LFTs of the switches for handling the newly added LID. Computing a new set of paths in order to handle the newly added VM is not desirable in a dynamic environment where several VMs may be booted every minute. In large IB subnets, computing a new set of routes can take several minutes, and this procedure would have to repeat each time a new VM is booted.

Advantageously, in accordance with an embodiment, because all the VFs in a hypervisor share the same uplink with the PF, there is no need to compute a new set of routes. It is only needed to iterate through the LFTs of all the physical switches in the network, copy the forwarding port from the LID entry that belongs to the PF of the hypervisor—where the VM is created—to the newly added LID, and send a single SMP to update the corresponding LFT block of the particular switch. Thus the system and method avoids the need to compute a new set of routes.

In accordance with an embodiment, the LIDs assigned in the vSwitch with dynamic LID assignment architecture do not have to be sequential. When comparing the LIDs assigned on VMs on each hypervisor in vSwitch with prepopulated LIDs versus vSwitch with dynamic LID assignment, it is notable that the LIDs assigned in the dynamic LID assignment architecture are non-sequential, while those prepopulated in are sequential in nature. In the vSwitch dynamic LID assignment architecture, when a new VM is created, the next available LID is used throughout the lifetime of the VM. Conversely, in a vSwitch with prepopulated LIDs, each VM inherits the LID that is already assigned to the corresponding VF, and in a network without live migrations, VMs consecutively attached to a given VF get the same LID.

In accordance with an embodiment, the vSwitch with dynamic LID assignment architecture can resolve the drawbacks of the vSwitch with prepopulated LIDs architecture model at a cost of some additional network and runtime SM overhead. Each time a VM is created, the LFTs of the physical switches in the subnet are updated with the newly added LID associated with the created VM. One subnet management packet (SMP) per switch is needed to be sent for this operation. The LMC-like functionality is also not available, because each VM is using the same path as its host hypervisor. However, there is no limitation on the total amount of VFs present in all hypervisors, and the number of VFs may exceed that of the unicast LID limit. Of course, not all of the VFs are allowed to be attached on active VMs simultaneously if this is the case, but having more spare hypervisors and VFs adds flexibility for disaster recovery and optimization of fragmented networks when operating close to the unicast LID limit.

Figure 9:
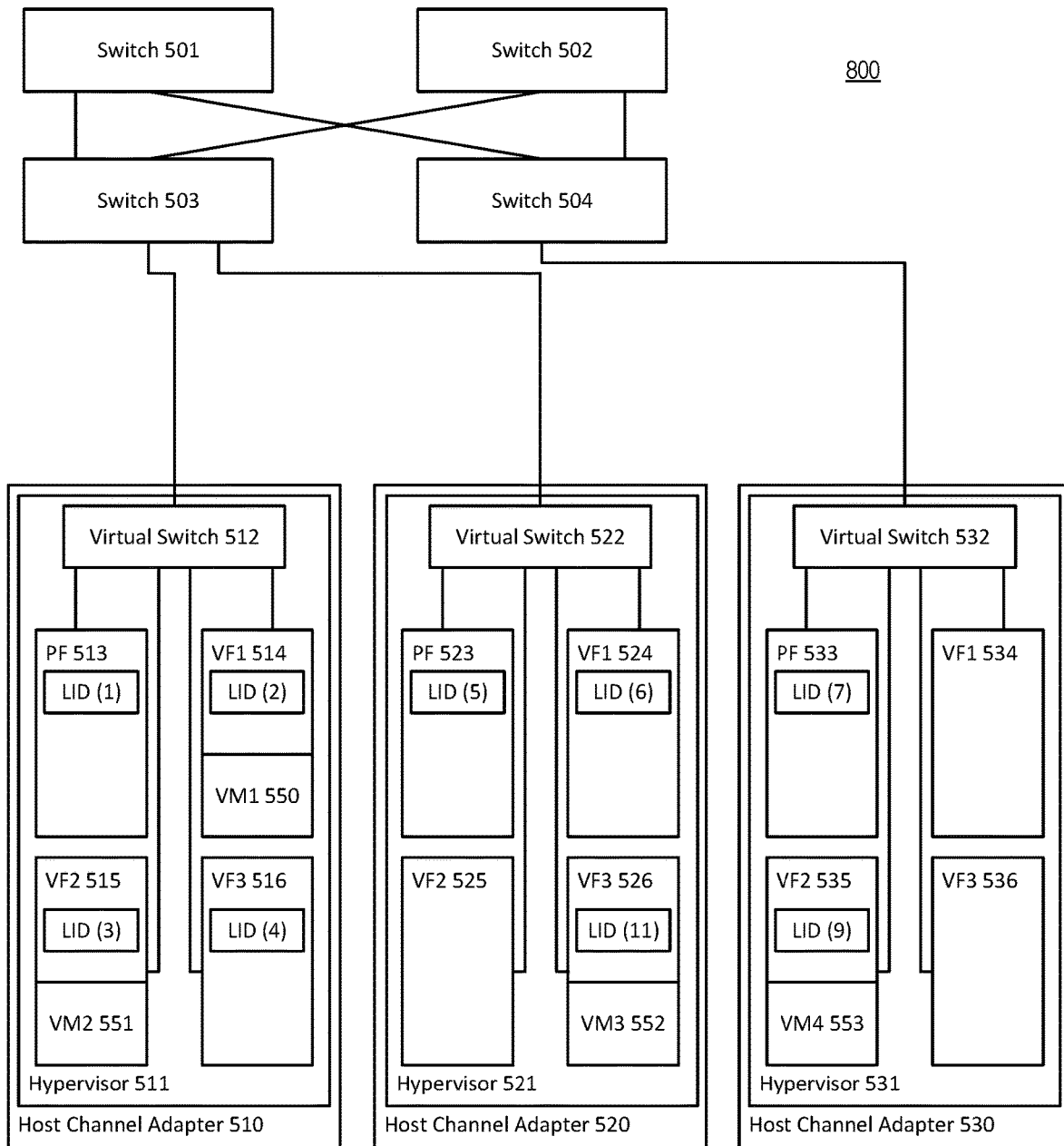
FIG. 9 shows an exemplary vSwitch architecture with vSwitch with dynamic LID assignment and prepopulated LIDs, in accordance with an embodiment.

InfiniBand SR-IOV Architecture Models—vSwitch with Dynamic LID Assignment and Prepopulated LIDs FIG. 9 shows an exemplary vSwitch architecture with vSwitch with dynamic LID assignment and prepopulated LIDs, in accordance with an embodiment. As depicted in the figure, a number of switches 501-504 can provide communication within the network switched environment 800 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515. Hypervisor 521 can assign virtual machine 3 552 to virtual function 3 526. Hypervisor 531 can, in turn, assign virtual machine 4 553 to virtual function 2 535. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 800.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a hybrid vSwitch architecture with dynamic LID assignment and prepopulated LIDs. Referring to FIG. 9, hypervisor 511 can be arranged with vSwitch with prepopulated LIDs architecture, while hypervisor 521 can be arranged with vSwitch with prepopulated LIDs and dynamic LID assignment. Hypervisor 531 can be arranged with vSwitch with dynamic LID assignment. Thus, the physical function 513 and virtual functions 514-516 have their LIDs prepopulated (i.e., even those virtual functions not attached to an active virtual machine are assigned a LID). Physical function 523 and virtual function 1 524 can have their LIDs prepopulated, while virtual function 2 and 3, 525 and 526, have their LIDs dynamically assigned (i.e., virtual function 2 525 is available for dynamic LID assignment, and virtual function 3 526 has a LID of 11 dynamically assigned as virtual machine 3

552 is attached). Finally, the functions (physical function and virtual functions) associated with hypervisor 3 531 can have their LIDs dynamically assigned. This results in virtual functions 1 and 3, 534 and 536, are available for dynamic LID assignment, while virtual function 2 535 has LID of 9 dynamically assigned as virtual machine 4 553 is attached there.

In accordance with an embodiment, such as that depicted in FIG. 9, where both vSwitch with prepopulated LIDs and vSwitch with dynamic LID assignment are utilized (independently or in combination within any given hypervisor), the number of prepopulated LIDs per host channel adapter can be defined by a fabric administrator and can be in the range of 0 <=prepopulated VFs <=Total VFs (per host channel adapter), and the VFs available for dynamic LID assignment can be found by subtracting the number of prepopulated VFs from the total number of VFs (per host channel adapter).

In accordance with an embodiment, much like physical host channel adapters can have more than one port (two ports are common for redundancy), virtual HCAs can also be represented with two ports and be connected via one, two or more virtual switches to the external IB subnet.

InfiniBand—Inter-Subnet Communication (Fabric Manager)

In accordance with an embodiment, in addition to providing an InfiniBand fabric within a single subnet, embodiments of the current disclosure can also provide for an InfiniBand fabric that spans two or more subnets.

Figure 10:
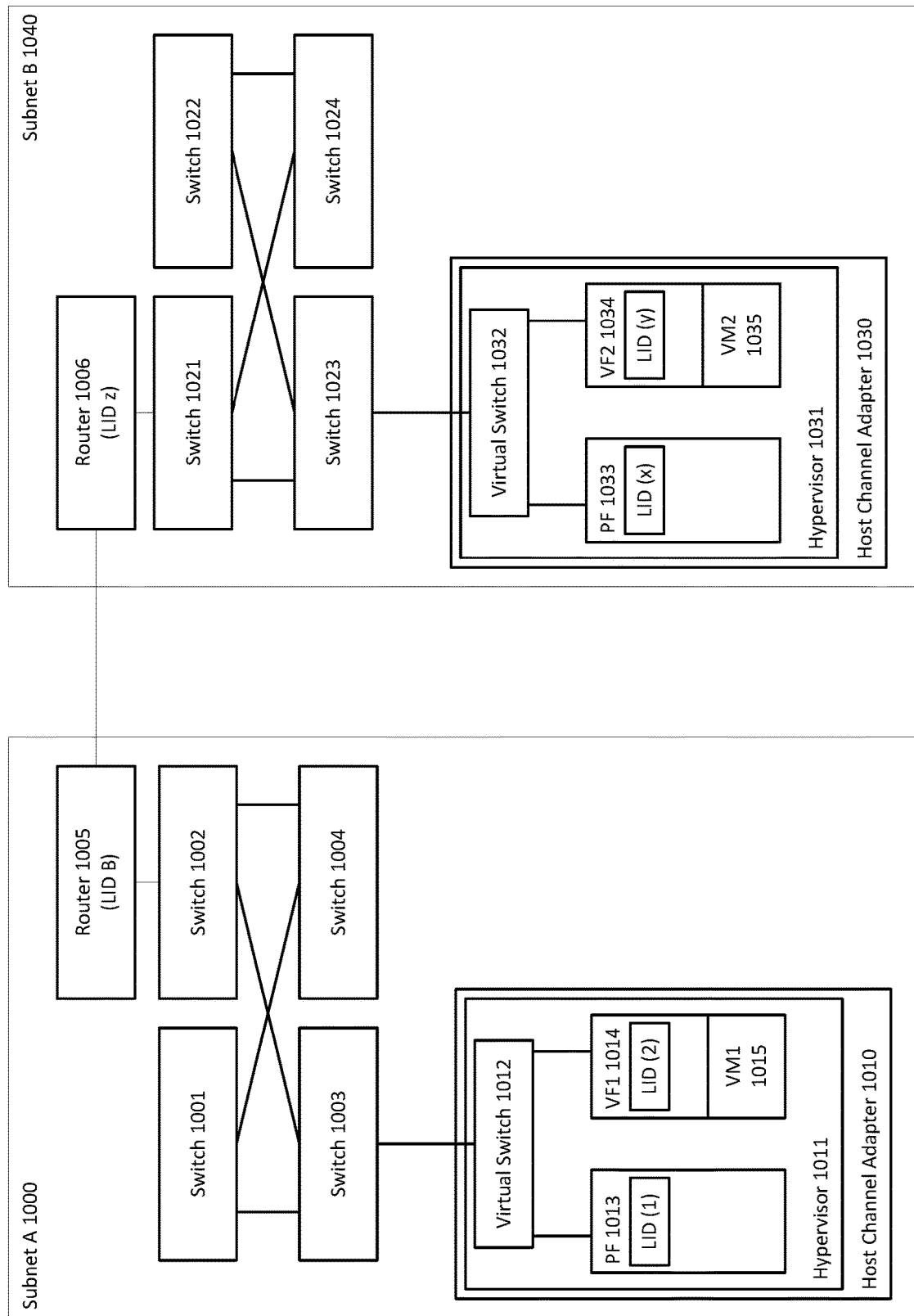
FIG. 10 shows an exemplary multi-subnet InfiniBand fabric, in accordance with an embodiment.

FIG. 10 shows an exemplary multi-subnet InfiniBand fabric, in accordance with an embodiment. As depicted in the figure, within subnet A 1000, a number of switches 1001-1004 can provide communication within subnet A 1000 (e.g., an IB subnet) between members of a fabric, such as an InfiniBand fabric. The fabric can include a number of hardware devices, such as, for example, channel adapter 1010. Host channel adapters 1010 can in turn interact with a hypervisor 1011. The hypervisor can, in turn, in conjunction with the host channel adapter it interacts with, setup a number of virtual functions 1014. The hypervisor can additionally assign virtual machines to each of the virtual functions, such as virtual machine 1 10105 being assigned to virtual function 1 1014. The hypervisor can access their associated host channel adapters through a fully featured physical function, such as physical function 1013, on each of the host channel adapters. Within subnet B 1040, a number of switches 1021-1024 can provide communication within subnet b 1040 (e.g., an IB subnet) between members of a fabric, such as an InfiniBand fabric. The fabric can include a number of hardware devices, such as, for example, channel adapter 1030. Host channel adapters 1030 can in turn interact with a hypervisor 1031. The hypervisor can, in turn, in conjunction with the host channel adapter it interacts with, setup a number of virtual functions 1034. The hypervisor can additionally assign virtual machines to each of the virtual functions, such as virtual machine 2 1035 being assigned to virtual function 2 1034. The hypervisor can access their associated host channel adapters through a fully featured physical function, such as physical function 1033, on each of the host channel adapters. It is noted that although only one host channel adapter is shown within each subnet (i.e., subnet A and subnet B), it is to be understood that a plurality of host channel adapters, and their corresponding components, can be included within each subnet.

In accordance with an embodiment, each of the host channel adapters can additionally be associated with a virtual switch, such as virtual switch 1012 and virtual switch 1032, and each HCA can be set up with a different architecture model, as discussed above. Although both subnets within FIG. 10 are shown as using a vSwitch with prepopulated LID architecture model, this is not meant to imply that all such subnet configurations must follow a similar architecture model.

In accordance with an embodiment, at least one switch within each subnet can be associated with a router, such as switch 1002 within subnet A 1000 being associated with router 1005, and switch 1021 within subnet B 1040 being associated with router 1006.

In accordance with an embodiment, at least one device (e.g., a switch, a node . . . etc.) can be associated with a fabric manager (not shown). The fabric manager can be used, for example, to discover inter-subnet fabric topology, created a fabric profile (e.g., a virtual machine fabric profile), build a virtual machine related database objects that forms the basis for building a virtual machine fabric profile. In addition, the fabric manager can define legal inter-subnet connectivity in terms of which subnets are allowed to communicate via which router ports using which partition numbers.

In accordance with an embodiment, when traffic at an originating source, such as virtual machine 1 within subnet A, is addressed to a destination at a different subnet, such as virtual machine 2 within subnet B, the traffic can be addressed to the router within subnet A, i.e., router 1005, which can then pass the traffic to subnet B via its link with router 1006.

Scalable Representation of Switch Port Status

In accordance with an embodiment, under the IB specification, in order to observe link status change, the IB specification defines that an attribute at each port (e.g., at each of the ports at any given switch or virtual switch) that can indicate when any port state has changed. In order for the SM to determine whether a status at any port within the fabric has changed state, the SM must send a subnet management packet for each port in order to determine whether the port status has changed.

In accordance with an embodiment, although the above defined method for determining port status within a fabric works well for fabrics that are mostly static (e.g., those fabrics made up from physical end nodes where a port status change does not happen very often), the method does not scale well for those fabrics that have been virtualized (e.g., with introduction of virtual HCAs used by dynamically created virtual machines and where a vSwitch architecture is used to interconnected virtual HCA ports) as well as for very large physical fabric configurations.

In accordance with an embodiment, a scalable representation of switch port status can be provided. By adding a scalable representation of switch port status at each switch (both physical and virtual)—instead of getting all switch port changes individually, the scalable representation of switch port status can combine a number of ports that can scale by just using a few bits of information for each port's status.

In accordance with an embodiment, a scalable representation of switch port status can be a fixed size message at each switch that can represent all the port status information for all, or a subset of, the ports in the switch associated with the fixed size message. That is in particular important in fabrics using virtualization, as the scalable representation can dynamically represent the virtual switch and its associated ports. As discussed above, virtual machines (i.e., virtual end nodes) are able to, and designed to, migrate (e.g., for performance benefits), which can mean frequently changing port status on physical and virtual switches within a fabric. The legacy specification relied on changes not being frequent—that is when the SM checked to see if any state changes had taken place since the last check, it was unlikely that any changes had occurred (default nothing changed), so the SM could receive an indication if there was any change for any port in a single operation and could move on to the next switch if not. However, whenever any changes occurred for any port, then all ports had to be inspected individually by the SM. However, with virtual machines, a SM can expect to detect more frequent state changes at the ports in the fabric.

In accordance with an embodiment, a scalable representation of switch port status can be a fixed size message (e.g., a switch attribute) that can provide the SM with the means to observe all state changes of all ports at a switch in one operation (i.e., one SMP). This reduces the overhead that the SM would otherwise encounter, and optimizes the SM mechanism to query each switch to determine which ports need further handling.

In accordance with an embodiment, normally, observing/ checking link status for individual switch ports requires multiple SMP operations, as one SMP must be sent for each port at a switch. However, by combining each link status into a single attribute, a SM can send fewer SMPs to each switch to discover the link status at each port, thus reducing the overhead required for topology discovery. As well, the overhead is likewise reduced for the SM to determine whether it needs to perform additional operations on a port for retrieving more information or to set up new configuration parameters.

In accordance with an embodiment, a scalable representation of switch port status can be an attribute where port/link status is represented as scalar objects (single or multi-bit values). This attribute in which the scalar objects are contained can provide a compressed way of fetching logical link state of a (virtual) switch. Such an attribute can additionally be used by routing algorithms in order to ignore virtual links while balancing the various routes through the fabric.

In accordance with an embodiment, 64 bit mask values are sufficient to cover all switches (existing switches generally have fewer than 64 ports). However, this cap on bit mask values can be extended, through the use of attribute modifier indexing into higher port ranges, if larger switches are used.

In accordance with an embodiment, in addition to reducing the number of SMPs needed for a SM to determine if any state changes have taken place at the ports/links in the fabric, the scalable representation of switch port status can also optimize the SM discovery of topology of the fabric as each port's link status can be represented as a scalar object within the attribute.

Figure 11:
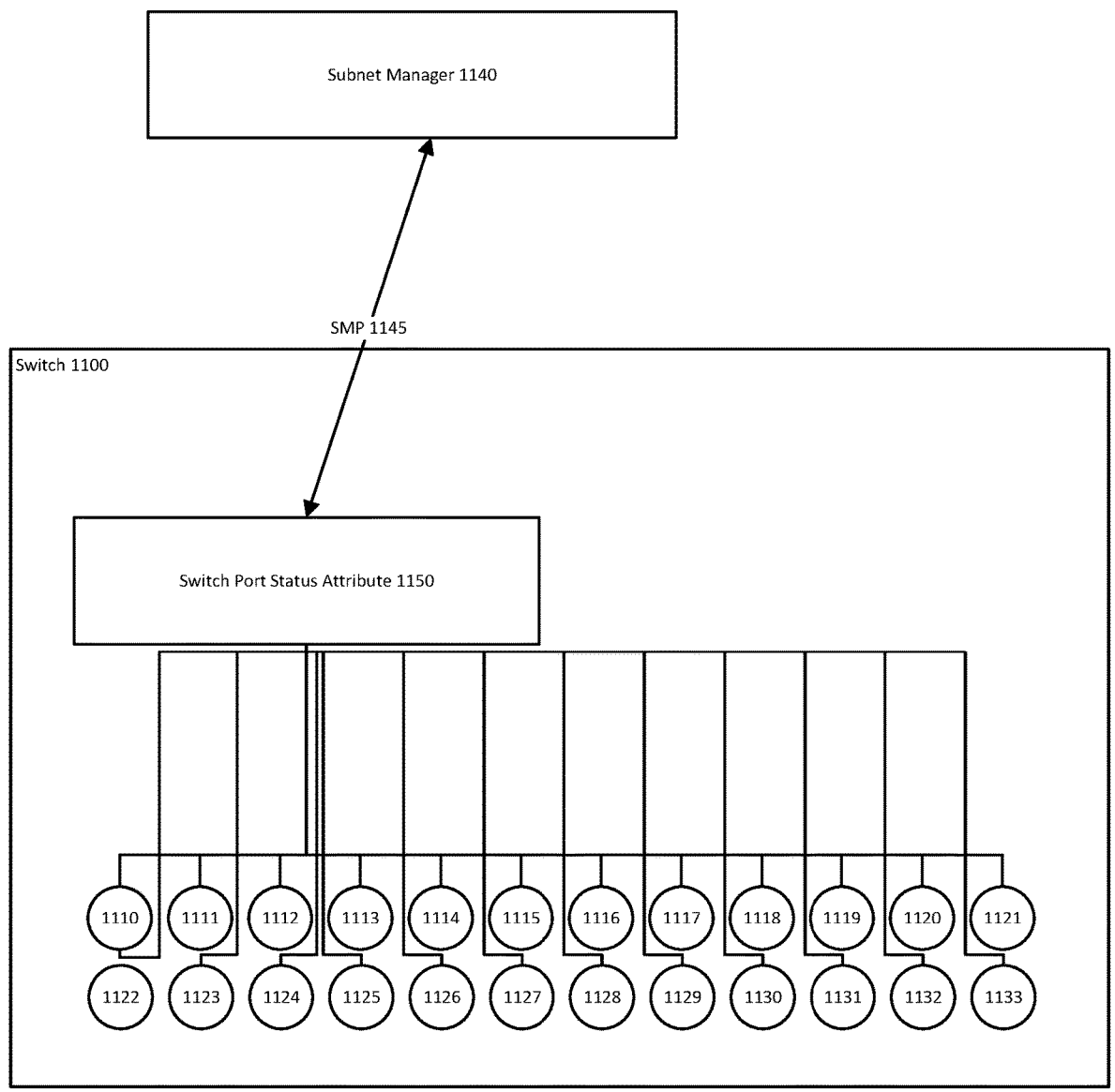
FIG. 11 shows a scalable representation of switch port status, in accordance with an embodiment.

FIG. 11 shows a scalable representation of switch port status, in accordance with an embodiment. More specifically, FIG. 11 illustrates a switch having an attribute representing a scalable representation of switch port status.

In accordance with an embodiment, and as depicted in FIG. 11, a switch 1100 can comprise a number of ports, such as ports 1110-1133 (it is noted that the number of ports shown in FIG. 11 is not illustrative nor indicative of a usual number of ports at a given switch within a fabric, such as an InfiniBand fabric). The switch 1100 also comprises a switch port status attribute 1150 which can be a fixed size message that represents the switch port status information for switch port 1110-1133 in the switch 1100.

In accordance with an embodiment, a management module, such as the subnet manager 1140 can, instead of sending one SMP to each port within the switch 1100 to determine each port's status, send one SMP 1145 to query the switch port status attribute 1150. The SMP can relay each ports' 1110-1133 status at the time of checking.

Figure 12:
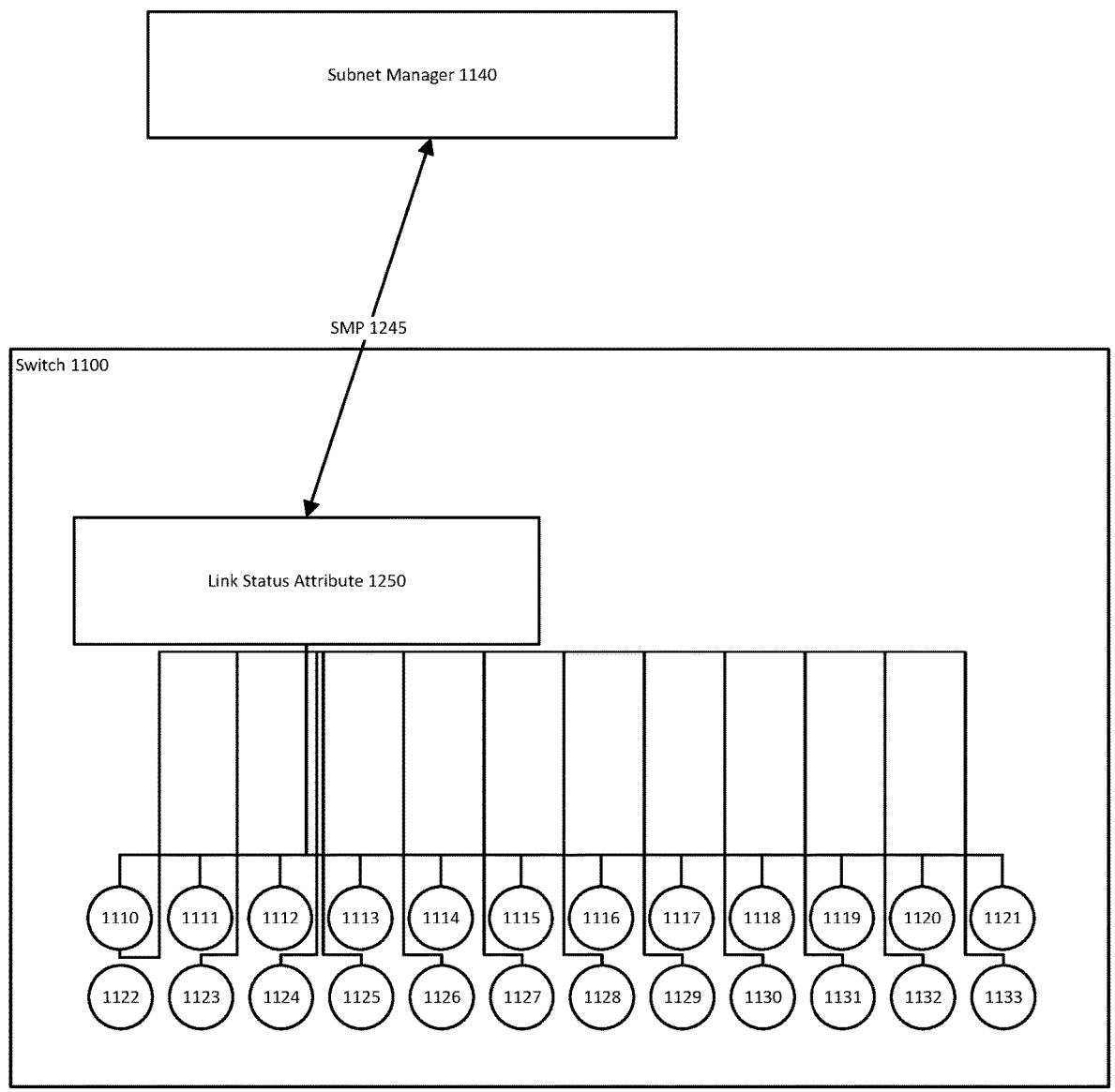
FIG. 12 shows a scalable representation of extended link status, in accordance with an embodiment.

FIG. 12 shows a scalable representation of extended link status, in accordance with an embodiment. More specifically, FIG. 12 illustrates a switch having an attribute representing a scalable representation of extended link status.

In accordance with an embodiment, and as depicted in FIG. 12, a switch 1100 can comprise a number of ports, such as ports 1110-1133 (it is noted that the number of ports shown in FIG. 12 is not illustrative nor indicative of a usual number of ports at a given switch within a fabric, such as an InfiniBand fabric). The switch 1100 also comprises an extended link status attribute 1250 which can be a fixed size message that represents the status of any links connected to the switch ports 1110-1133 in the switch 1100.

In accordance with an embodiment, a management module, such as the subnet manager 1140 can, instead of sending one SMP to each port within the switch 1100 to determine the extended link status at each port, send one SMP 1245 to query the extended link status attribute 1250. The SMP can relay the link status for each port 1110-1133 status at the time of checking.

Figure 13:
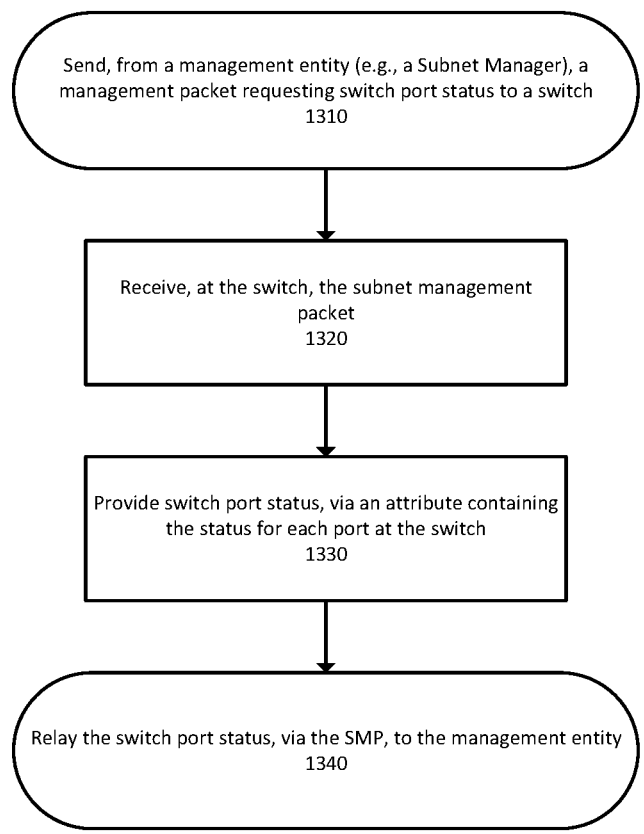
FIG. 13 is a flowchart for a method for supporting scalable representation of switch port status in a high performance computing environment, in accordance with an embodiment.

FIG. 13 is a flowchart for a method for supporting scalable representation of switch port status in a high performance computing environment, in accordance with an embodiment.

At step 1310, a management entity, such as an InfiniBand Subnet Manager, can send a management packet to a switch requesting the switch port status for each port at the switch to which the management packet is sent.

At step 1320, the switch to which the management packet is sent can receive the management packet.

At step 1330, the switch can provide the status for each of its switch ports via an attribute that contains the switch port status for each port at the switch.

At step 1340, the requested status for each switch port can be relayed, via the management packet to the management entity, such as the InfiniBand Subnet Manager.

Figure 14:
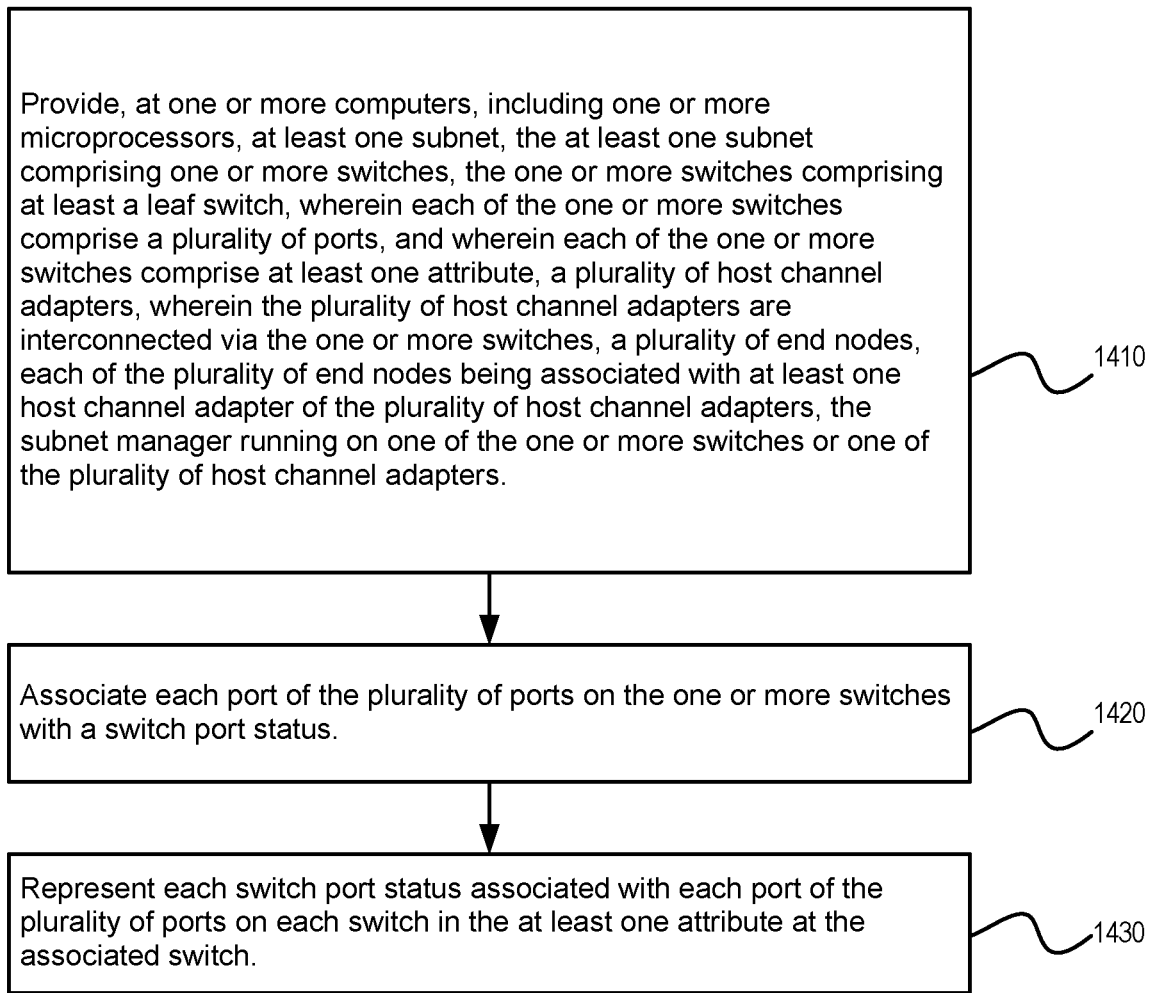
FIG. 14 is a flowchart for a method for supporting scalable representation of switch port status in a high performance computing environment, in accordance with an embodiment.

FIG. 14 is a flowchart for a method for supporting scalable representation of switch port status in a high performance computing environment, in accordance with an embodiment. At step 1410, the method can provide, at one or more computers, including one or more microprocessors, at least one subnet, the at least one subnet comprising one or more switches, the one or more switches comprising at least a leaf switch, wherein each of the one or more switches comprise a plurality of ports, and wherein each of the one or more switches comprise at least one attribute, a plurality of host channel adapters, wherein the plurality of host channel adapters are interconnected via the one or more switches, a plurality of end nodes, each of the plurality of end nodes being associated with at least one host channel adapter of the plurality of host channel adapters, the subnet manager running on one of the one or more switches or one of the plurality of host channel adapters.

At step 1420, the method can associate each port of the plurality of ports on the one or more switches with a switch port status.

At step 1430, the method can represent each switch port status associated with each port of the plurality of ports on each switch in the at least one attribute at the associated switch.

Many features of the present invention can be performed in, using, or with the assistance of hardware, software, firmware, or combinations thereof. Consequently, features of the present invention may be implemented using a processing system (e.g., including one or more processors).

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs). Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting scalable representation of switch port status in a high performance computing environment, comprising:
    one or more microprocessors;
    at least one subnet, the at least one subnet comprising
        one or more switches, the one or more switches comprising at least a leaf switch, wherein each of the one or more switches comprise a plurality of ports,
        a plurality of host channel adapters, wherein the plurality of host channel adapters are interconnected via the one or more switches,
        a plurality of end nodes, each of the plurality of end nodes being associated with at least one host channel adapter of the plurality of host channel adapters, and
        a subnet manager, the subnet manager running on one of the one or more switches or one of the plurality of host channel adapters;
    wherein each of the one or more switches comprise a fixed-size status attribute;
    wherein each port of the plurality of ports on a first switch the one or more switches is associated with a switch port status and an extended link status;
    wherein each switch port status and each extended link status associated with each port of the plurality of ports on the first switch is represented in a fixed-size status attribute at the first switch; and
    wherein the subnet manager determines the switch port status and extended link status for each port on the first switch using one operation to query the fixed-size status attribute at the first switch.

2. The system of claim 1, wherein the one operation is a subnet management packet that queries the fixed-size status attribute at the first switch.

3. The system of claim 1, wherein the subnet manager determines the extended link status for each port on the first switch using one operation.

4. The system of claim 3, wherein the one operation is a subnet management packet that queries the fixed-size status attribute at the first switch.

5. The system of claim 1, wherein a host channel adapter of the plurality of host channel adapters comprises a virtual switch, the virtual switch comprising a plurality of virtual switch ports;
    wherein each virtual switch port is associated with a virtual switch port status; and
    wherein each virtual switch port status associated with each virtual switch port is represented in a fixed-size status attribute at the virtual switch.

6. A method for supporting scalable representation of switch port status in a high performance computing environment, comprising:
    providing, at one or more computers, including one or more microprocessors,
    at least one subnet, the at least one subnet comprising
        one or more switches, the one or more switches comprising at least a leaf switch, wherein each of the one or more switches comprise a plurality of ports, and wherein each of the one or more switches comprise a fixed-size status attribute, a plurality of host channel adapters, wherein the plurality of host channel adapters are interconnected via the one or more switches, a plurality of end nodes, each of the plurality of end nodes being associated with at least one host channel adapter of the plurality of host channel adapters, and a subnet manager, the subnet manager running on one of the one or more switches or one of the plurality of host channel adapters;

associating each port of the plurality of ports on a first switch of the one or more switches with a switch port status and an extended link status;

representing each switch port status and extended link status associated with each port of the plurality of ports on the first switch in a fixed-size status attribute at the first switch; and determining, by the subnet manager, the switch port status and extended link status for each port on the first switch using one operation to query the fixed-size status attribute at the first switch.

7. The method of claim 6, wherein the one operation is a subnet management packet.

8. The method of claim 6, further comprising:
determining, by the subnet manager, the extended link status for each port the first switch using one operation.

9. The method of claim 8, wherein the one operation is a subnet management packet that queries the fixed-size status attribute at the first switch.

10. The method of claim 6, wherein a host channel adapter of the plurality of host channel adapters comprises a virtual switch, the virtual switch comprising a plurality of virtual switch ports;

wherein each virtual switch port is associated with a virtual switch port status; and wherein each virtual switch port status associated with each virtual switch port is represented in a fixed-size status attribute at the virtual switch.

11. A non-transitory computer readable storage medium, including instructions stored thereon for supporting scalable representation of switch port status in a high performance computing environment, which when read and executed by one or more computers cause the one or more computers to perform steps comprising:

providing, at one or more computers, including one or more microprocessors, at least one subnet, the at least one subnet comprising
one or more switches, the one or more switches comprising at least a leaf switch, wherein each of the one or more switches comprise a plurality of ports, and wherein each of the one or more switches comprise a fixed-size status attribute, a plurality of host channel adapters, wherein the plurality of host channel adapters are interconnected via the one or more switches, a plurality of end nodes, each of the plurality of end nodes being associated with at least one host channel adapter of the plurality of host channel adapters, and a subnet manager, the subnet manager running on one of the one or more switches or one of the plurality of host channel adapters;

associating each port of the plurality of ports on a first switch of the one or more switches with a switch port status and an extended link status;

representing each switch port status and extended link status associated with each port of the plurality of ports on the first switch in a fixed-size status attribute at the first switch; and determining, by the subnet manager, the switch port status and extended link status for each port on the first switch using one operation to query the fixed-size status attribute at the first switch.

12. The non-transitory computer readable storage medium of claim 11, wherein the one operation is a subnet management packet that queries the fixed-size status attribute at the first switch.

13. The non-transitory computer readable storage medium of claim 11, the steps further comprising:
determining, by the subnet manager, the extended link status for each port the first switch using one operation.

14. The non-transitory computer readable storage medium of claim 13, wherein the one operation is a subnet management packet that queries the fixed-size status attribute at the first switch.

* * * * *